United States Patent
Seyoum et al.

(10) Patent No.: US 12,059,872 B2
(45) Date of Patent: *Aug. 13, 2024

(54) ACRYLIC MULTILAYER FOIL WITH IMPROVED MECHANICAL PROPERTIES AND A HIGH WEATHERING RESISTANCE

(71) Applicant: Roehm GmbH, Darmstadt (DE)

(72) Inventors: Ghirmay Seyoum, Egelsbach (DE);
Michael Enders, Dieburg (DE);
Herbert Groothues, Bensheim (DE);
Claude Guenanten, Darmstadt (DE);
Kim Struwe, Frankfurt am Main (DE);
Helmut Haering, Otzberg (DE);
Girolamo Musci, Frankenthal (DE)

(73) Assignee: Roehm GmbH, Darmstadt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/904,265

(22) PCT Filed: Feb. 18, 2021

(86) PCT No.: PCT/EP2021/053998
§ 371 (c)(1),
(2) Date: Aug. 15, 2022

(87) PCT Pub. No.: WO2021/165381
PCT Pub. Date: Aug. 26, 2021

(65) Prior Publication Data
US 2023/0100304 A1    Mar. 30, 2023

(30) Foreign Application Priority Data
Feb. 18, 2020   (EP) .................................... 20157833

(51) Int. Cl.
*B32B 27/08*   (2006.01)
*B32B 27/18*   (2006.01)
(Continued)

(52) U.S. Cl.
CPC .............. *B32B 27/08* (2013.01); *B32B 27/18* (2013.01); *B32B 27/308* (2013.01);
(Continued)

(58) Field of Classification Search
None
See application file for complete search history.

(56) References Cited

U.S. PATENT DOCUMENTS

| 4,801,495 A | 1/1989 | van der Hoeven |
| 2006/0217472 A1 * | 9/2006 | Staunton .................. C08K 5/29 524/262 |

(Continued)

FOREIGN PATENT DOCUMENTS

| EP | 0 166 153 A1 | 1/1986 |
| EP | 1 664 191 B1 | 11/2010 |

(Continued)

OTHER PUBLICATIONS

Tinuvin® 360 data sheet (Year: 2023).*

(Continued)

*Primary Examiner* — Ramsey Zacharia
(74) *Attorney, Agent, or Firm* — Oblon, McClelland, Maier & Neustadt, L.L.P.

(57) ABSTRACT

An acrylic multilayer foil includes a layer A in which silica particles are uniformly distributed in an acrylic polymer matrix and a coating layer D. Due to adhesive promoting properties of the layer A containing silica particles, the coating layer D can be advantageously applied onto the layer A. The foil has a high weathering resistance and excellent mechanical properties. Therefore, the foil is highly suitable for surface-protection of materials such as polyvinyl chloride (PVC) and for use in high-pressure laminates (HPLs).

17 Claims, 4 Drawing Sheets

(51) Int. Cl.
  *B32B 27/30* (2006.01)
  *B32B 27/32* (2006.01)
(52) U.S. Cl.
  CPC ........ *B32B 27/322* (2013.01); *B32B 2250/04* (2013.01); *B32B 2250/05* (2013.01); *B32B 2250/24* (2013.01); *B32B 2255/10* (2013.01); *B32B 2255/26* (2013.01); *B32B 2264/1021* (2020.08); *B32B 2307/71* (2013.01); *B32B 2307/732* (2013.01)

(56) References Cited

U.S. PATENT DOCUMENTS

| | | | | |
|---|---|---|---|---|
| 2006/0234061 | A1* | 10/2006 | Buckel | C08K 5/34 428/412 |
| 2008/0248298 | A1 | 10/2008 | Numrich et al. | |
| 2010/0025373 | A1* | 2/2010 | Barthel | C09G 1/02 423/337 |
| 2010/0288164 | A1* | 11/2010 | Schubert | C09D 7/42 428/404 |
| 2015/0044441 | A1 | 2/2015 | Guenanten et al. | |
| 2016/0326744 | A1 | 11/2016 | Doehring et al. | |
| 2017/0197391 | A1 | 7/2017 | Parusel et al. | |
| 2019/0358940 | A1 | 11/2019 | Guénanten et al. | |

FOREIGN PATENT DOCUMENTS

| | | |
|---|---|---|
| EP | 3 094 493 B1 | 10/2017 |
| WO | WO 2015/180995 A1 | 12/2015 |
| WO | WO 2017/056141 A1 | 4/2017 |

OTHER PUBLICATIONS

Sabostab® 119 data sheet (Year: 2023).*
International Search Report mailed on May 14, 2021 in PCT/EP2021/053998 filed on Feb. 18, 2021 3 pages.

* cited by examiner

ACRYLIC MULTILAYER FOIL WITH IMPROVED MECHANICAL PROPERTIES AND A HIGH WEATHERING RESISTANCE

CROSS-REFERENCE TO RELATED APPLICATIONS

This application is a National Stage entry under 35 U.S.C. § 371 of PCT/EP2021/053998, filed on Feb. 18, 2021, and claims priority to European Patent Application No. 20157833.3, filed on Feb. 18, 2020, the entire contents of which are incorporated herein by reference.

FIELD OF THE INVENTION

The present invention relates to an acrylic multilayer foil comprising a layer A in which silica particles are uniformly distributed in an acrylic polymer matrix and a coating layer D. Due to adhesive promoting properties of the layer A comprising silica particles, the coating layer D can be advantageously applied onto the layer A. The foil has a high weathering resistance and excellent mechanical properties. Therefore, the foil of the present invention is highly suitable for surface-protection of materials such as polyvinyl chloride (PVC) and for use in high-pressure laminates (HPLs), in particular, continuous pressure laminates (CPLs).

PRIOR ART

HPLs are used in a broad variety of applications such as table tops, doors, furniture, kitchen worktops, sheets for cladding of walls, balconies or facades of buildings. For instance, EP 3 0944 93 and EP 0 166 153 describe HPLs for indoor and outdoor applications.

Indoor applications normally require no protection from UV light, but HPLs for outdoor use must necessarily comprise a UV protective top layer, because melamine resins of HPLs rapidly degrade even after short-term exposition to solar UV radiation. Acrylic foils with one of several UV absorbers have recently found a widespread use as top layer for this purpose.

Although acrylic foils have an excellent inherent resistance against solar UV light, they have only a moderate resistance against mechanical damages and can be easily scratched. On the other hand, adhesion of common scratch-resistant coatings to untreated acrylic materials such as polymethyl methacrylate (PMMA) is insufficient, so that no scratch-resistant acrylic-based HPLs with UV protection are available on the market. Only a moderate scratch-resistance of HPLs used for cladding of walls, balconies or facades of buildings and their vulnerability to vandalism has been therefore a long existing problem, particularly in socially troubled urban areas. Furthermore, walls, balconies and facades of buildings are often exposed to corrosive materials such as bird droppings and urine. Accordingly, they need to have an appropriate chemical resistance.

Furthermore, purely physical adhesion of acrylic foils to reactive-resin-coated paper of HPLs is not sufficient to ensure its stability over a number of years, so that a partial or even complete delamination of the acrylic foil from the HPL surface, caused by weathering effects, can take place. To overcome this drawback, EP 1 664 191 suggests lamination of the acrylic foil to the melamine-resin-impregnated paper on HPL with an adhesion promoter, for example copolymers comprising carboxylic acid anhydrides units. During HPL preparation procedure the carboxylic acid anhydride units chemically react with the melamine resin. Combined physical and chemical bonding of the acrylic foil to the reactive-resin-coated paper of HPLs and use of UV protection allows preparation of decorative HPLs that are stable for a number of years in outdoor use.

WO 2015/180995 discloses a three-layered foil having a particularly strong adhesion to HPL substrates and excellent optical properties. In this foil, the outermost layer is a layer that contains a fluoropolymer, the middle layer is a PMMA layer that contains at least one UV absorber and/or UV stabilizer, and the innermost layer is a PMMA layer that contains at least one adhesion promoter which improves adhesion to the substrate.

Still, long term weathering stability of adhesion-promoting copolymers described in WO 2015/180995 is often lower than that of pure PMMA. Consequently, delamination of HPLs coated with such materials may take place after a long-term exposition to UV radiation, even if such copolymers are located beneath UV absorbing PMMA layers. Moderate weathering stability of these copolymers becomes even more problematic, if these copolymers are located on top of a PMMA layer and are directly exposed to solar UV radiation. For this reason, these copolymers can normally not be employed for attaching a scratch-resistant layer to an acrylic foil for outdoor use.

OBJECT OF THE INVENTION

It has therefore been an object of the present invention to provide a novel acrylic foil for finishing of HPLs which exhibits good initial and long-term adhesion when laminated to HPLs. These HPLs should exhibit no signs of delamination even after a long-time outdoor use and have excellent mechanical properties, in particular, a high scratch resistance.

Another goal of the present intention was provision of an acrylic foil which reliably provides not only high intrinsic weathering resistance but also adequate protection for items such as HPLs against moisture, wind, solar UV radiation and mechanical damages.

A further aspect of the present invention was provision of HPLs for outdoor use having above features.

Finally, another goal of the invention was provision of a cost-efficient preparation method for manufacturing of HPLs with the desired properties.

SUMMARY OF THE INVENTION

The present invention is based on a surprising finding that a substantially uniform incorporation of particulate silica into an impact-modified acrylic layer of a multilayer foil allows a remarkable improvement of adhesion properties of said layer. This layer can be directly coated with a liquid coating composition, for instance, a scratch resistance coating or an anti-graffiti coating. Furthermore, this layer has a significantly higher UV resistance than a traditional adhesion-promoting layer with anhydride-based copolymers. Hence, HPLs comprising such foils are highly suitable for outdoor use in urban areas.

As will be readily appreciated by a skilled person, the term "foil" as used herein, refers to a sheet having a thickness below 5 mm, more preferably, below 1 mm. Although the foil of the present invention can be advantageously used as a protective coating, the term "foil" as used in the present application should be generally distinguished from the term "film". A film is typically a top layer of a multi-layer substrate and cannot be handled separately from said substrate. In contrast to a film, the foil of the present invention is not necessarily a layer of a multi-layer article i.e. is not necessarily attached to any substrate and can therefore be separately handled and used for a variety of different purposes.

Although silica particles are substantially uniformly dispersed in the moulding composition of layer A, they cause an excellent adhesion-promoting effect. The term "uniformly" as used herein means that the concentration of the silica particles within the layer is substantially constant. This observation is highly surprising because silica particles are often used for reducing adhesion i.e. as anti-blocking agents. For instance, US 2015/0044441 A1 describes multi-layer PMMA foils, which may comprise 0.01 to 0.5 wt.-% of anti-blocking agents such as $SiO_2$ particles. This document also describes use of from 0.5 to 20 wt.-% of matting agents such as $SiO_2$ particles in a PMMA layer.

The inventors further found that during preparation of the foil of the present invention, in particular by means of an extrusion process, silica particles remain visible on the surface of the resulting foil. In a preferred embodiment, silica particles project out (protrude) from the surface of the layer A (cf. FIG. 13). This phenomenon appears to be responsible for the observed adhesion enhancing effect. The material of the layer A also has an excellent thermal resistance and can therefore be advantageously processed by thermoplastic methods such as co-extrusion to form a multilayer foil additionally comprising the layers B and C described below.

In its first aspect, the present invention is directed to a multilayer foil comprising at least a layer A and a layer D adjacent to the layer A, wherein the layer A consists of a moulding composition comprising, based on the total weight of the layer A:

from 0.0 to 78.0 wt.-% of a polyalkyl (meth)acrylate
from 20.0 to 98.0 wt.-% of one or several impact modifiers
from 2.0 to 40.0 wt.-% of particulate silica
from 0.0 to 20.0 wt.-% of an adhesion-promoting copolymer comprising, based on the weight of the adhesion-promoting copolymer:
  (i) from 70.0 to 99.5 wt.-% methyl methacrylate
  (ii) from 0.5 to 15.0 wt.-% of an adhesion-promoting monomer; and
  (iii) from 0.0 to 25.0 wt.-% of other vinyl-copolymerizable monomers having no functional groups other than the vinyl function
from 0.0 to 38.0 wt.-% of a fluoropolymer
from 0.0 to 5.0 wt.-% of one or several UV absorbers
from 0.0 to 5.0 wt.-% of one or several UV stabilizers; and wherein the cumulative content of the polyalkyl (meth) acrylate and of one or several impact modifiers in the moulding composition of the layer A is at least 50 wt.-%, preferably at least 60 wt.-%, more preferably at least 70 wt.-%, yet even more preferably at least 80 wt.-%, particularly preferred at least 85 wt.-%, based on the weight of the layer A.

The layer D comprises at least a partially cross-linked material selected from cross-linked polyurethanes, cross-linked polyurethane-(meth)acrylates, cross-linked poly (meth)acrylates or a mixture thereof.

In the present application, the cumulative content of the polyalkyl (meth)acrylate and of one or several impact modifiers will be designated as "content of impact modified polyalkyl (meth)acrylate".

The material of the layer A has an excellent thermal stability and is suitable for thermoplastic processing such as extrusion, injection moulding and for foil-moulding processes such as chill-roll process. Therefore, the foils comprising the layer A and, optionally, layers B and C (the layers B and C will be described in the following) can be advantageously manufactured by means of co-extrusion. The layer D can be applied onto the layer A by means of coating.

The multilayer foils of the present invention are superior in terms of weathering resistance and mechanical resistance to the foils available on the market and have an improved stability over a prolonged period of time, typically more than 10 years. The term "stability" as used herein refers not only to the intrinsic stability of the foil with respect to weathering effects and mechanical damages but also to sustainability of its protective action.

Additionally, the multilayer foils of the present invention provide the following advantages:
  they can be employed for lamination of various substrates at varying temperatures and upon using different lamination techniques. If the layer A comprising particulate silica is directly applied onto the substrate, it provides an excellent long-term adhesion between the foil and the substrate. In particular, the foil has an excellent adhesion on melamine-resin-based- and phenol-resin-based substrates such as HPLs.
  The layer A comprising particulate silica can be directly uniformly coated with a liquid coating composition thereby providing an excellent adhesion between the coating layer D and the layer A. This allows impairing foil desired properties such as increased scratch-resistance in a particularly cost-efficient way.
  The foil comprising the layers A and, optionally B and C can be manufactured in an extrusion plant in a cost-effective manner. Subsequently, the layer D can be uniformly applied as a liquid coating onto the layer A.
  The foil has an excellent weathering resistance and is also resistant against chemicals commercially available cleaning compositions and alcoholic beverages and can be easily cleaned.

In its further aspect, the invention is directed to a process for the manufacturing of the foil comprising a layer A which consists of a moulding composition A, in which the foil is moulded in a foil-moulding process, preferably in chill-roll process from the composition A comprising:

from 0.0 to 78.0 wt.-% of a polyalkyl (meth)acrylate
from 20.0 to 98.0 wt.-% of one or several impact modifiers
from 2.0 to 40.0 wt.-% of particulate silica
from 0.0 to 20.0 wt.-% of an adhesion-promoting copolymer comprising, based on the weight of the adhesion-promoting copolymer:
  (i) from 70.0 to 99.5 wt.-% methyl methacrylate
  (ii) from 0.5 to 15.0 wt.-% of an adhesion-promoting monomer; and
  (iii) from 0.0 to 25.0 wt.-% of other vinyl-copolymerizable monomers having no functional groups other than the vinyl function;
from 0.0 to 38.0 wt.-% of a fluoropolymer
from 0.0 to 5.0 wt.-% of one or several UV absorbers
from 0.0 to 5.0 wt.-% of one or several UV stabilizers; and
wherein the content of impact modified polyalkyl (meth) acrylate in the moulding composition of the layer A is at least 50 wt.-%, preferably at least 60 wt.-%, more preferably at least 70 wt.-%, yet even more preferably at least 80 wt.-%, particularly preferred at least 85 wt.-%, based on the weight of the layer A.

Yet a further aspect of the present invention relates to a multi-layer article, preferably an HPL, comprising a substrate which is at least partially covered by the foil as defined above, comprising the layers in the following order, starting from the outer surface:
  layer D forming an outer surface of the multi-layer article
  layer A
  if present, layer B; and
  if present, layer C.

Finally, a further aspect of the present invention relates to a process for manufacturing of multi-layer article as defined above, the process comprising the following steps i) to iii):
  i) a foil comprising the layer A is prepared by extrusion or, if the layers B and, optionally, C are present, a foil comprising the layers A, B and, optionally, C is prepared by co-extrusion;
  ii) a coated foil is prepared by coating the layer A of the foil obtained in the step i) with a layer D;
  iii) the coated foil obtained in the step ii) is applied onto a substrate by means of lamination or extrusion lamination, wherein the multi-layer article is obtained; and wherein the coating layer D, if present, comprises a material which undergoes a partial cross-linking in the step ii) and a further cross-linking in the step iii).

DETAILED DESCRIPTION OF PREFERRED EMBODIMENTS

The foil comprising the layer A, and, optionally, layers B and C is obtainable by a process such as e.g. (co-)extrusion, in which the layer A is formed from a moulding composition in which silica particles are substantially uniformly dispersed in an impact-modified polyalkyl (meth)acrylate matrix. The layer D can be subsequently applied onto the layer A as a liquid coating.

The following embodiments of foils of the present invention showed particularly advantageous properties:

Foil Embodiment 1

Figure 1:
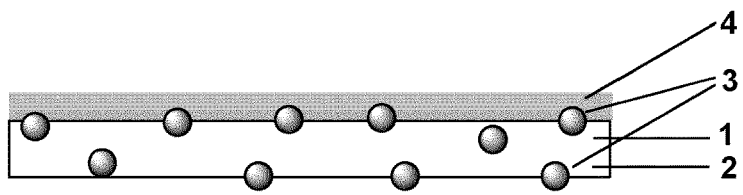
FIG. 1: foil of the present invention comprising the layer A coated with the layer D

The foil consists of layers D and A (cf. FIG. 1).

The layer D comprises at least a partially cross-linked polyurethane-(meth)acrylate.

The layer A consists of a moulding composition comprising, based on the total weight of the layer A:
  from 0.0 to 77.9 wt.-%, preferably from 0.0 to 64.9 wt.-%, more preferably from 0.0 to 52.9 wt.-%, still more preferably from 0.0 to 42.9 wt.-%, particularly preferably from 0.0 to 32.9 wt.-% of a polyalkyl (meth)acrylate
  from 20.0 to 97.9 wt.-%, preferably from 30.0 to 94.9 wt.-%, more preferably from 40.0 to 92.9 wt.-%, still more preferably from 50.0 to 92.9 wt.-%, particularly preferably from 60.0 to 92.9 wt.-% of one or several impact modifiers
  from 2.0 to 40.0 wt.-%, preferably from 5.0 to 30.0 wt.-%, more preferably from 7.0 to 20.0 wt.-% of particulate silica
  from 0.1 to 5.0 wt.-% of a triazine type UV absorber
  from 0.0 to 5.0 wt.-% of one or several UV stabilizers.

Foil Embodiment 2

Figure 2:
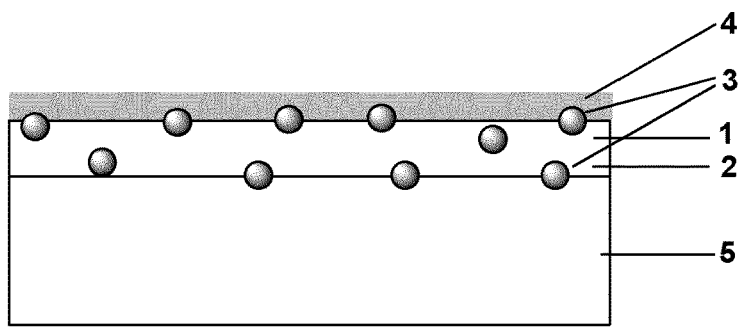
FIG. 2: foil of the present invention comprising the layer A coated with the layer D one side and an adjacent layer B on the other side

The foil consists of layers D, A and B (cf. FIG. 2).

The layer D comprises at least a partially cross-linked polyurethane-(meth)acrylate.

The layer A consists of a moulding composition comprising, based on the total weight of the layer A:
  from 0.0 to 77.9 wt.-%, preferably from 0.0 to 64.9 wt.-%, more preferably from 0.0 to 52.9 wt.-%, still more preferably from 0.0 to 42.9 wt.-%, particularly preferably from 0.0 to 32.9 wt.-% of a polyalkyl (meth)acrylate
  from 20.0 to 97.9 wt.-%, preferably from 30.0 to 94.9 wt.-%, more preferably from 40.0 to 92.9 wt.-%, still more preferably from 50.0 to 92.9 wt.-%, particularly preferably from 60.0 to 92.9 wt.-% of one or several impact modifiers
  from 2.0 to 40.0 wt.-%, preferably from 5.0 to 30.0 wt.-%, more preferably from 7.0 to 20.0 wt.-% of particulate silica
  from 0.1 to 5.0 wt.-% of a triazine type UV absorber
  from 0.0 to 5.0 wt.-% of one or several UV stabilizers.

The layer B consists of a moulding composition comprising, based on the total weight of the layer B:

from 0.0 to 77.9 wt.-%, preferably from 0.0 to 64.8 wt.-%, more preferably from 0.0 to 52.7 wt.-%, still more preferably from 0.0 to 42.7 wt.-%, particularly preferably from 0.0 to 33.0 wt.-% of a polyalkyl (meth)acrylate from 20.0 to 98.0 wt.-%, preferably from 30.0 to 95.0 wt.-%, more preferably from 40.0 to 93.0 wt.-%, still more preferably from 50.0 to 93.0 wt.-%, particularly preferably from 60.0 to 93.0 wt.-% of one or several impact modifiers from 0.1 to 5.0 wt.-%, preferably from 0.2 to 4.0 wt.-%, more preferably 0.3 to 3.0 wt.-% of a benzotriazole type UV absorber from 2.0 to 40.0 wt.-%, preferably from 5.0 to 35.0 wt.-%, more preferably from 7.0 to 30.0 wt.-% of an adhesion-promoting copolymer comprising, based on the weight of the adhesion-promoting copolymer:
  (i) from 70.0 to 95.0 wt.-% methyl methacrylate;
  (ii) from 0.5 to 15.0 wt.-% of an adhesion-promoting monomer; and
  (iii) from 0.0 to 25.0 wt.-% of other vinyl-copolymerizable monomers having no functional groups other than the vinyl function, based on the weight of the copolymer.

Foil Embodiment 3

The foil consists of layers D, A and B (cf. FIG. 2).

The layer D comprises at least a partially cross-linked polyurethane-(meth)acrylate.

The layer A consists of a moulding composition comprising, based on the total weight of the layer A:

from 0.0 to 77.9 wt.-%, preferably from 0.0 to 64.9 wt.-%, more preferably from 0.0 to 52.9 wt.-%, still more preferably from 0.0 to 42.9 wt.-%, particularly preferably from 0.0 to 32.9 wt.-% of a polyalkyl (meth)acrylate from 20.0 to 97.9 wt.-%, preferably from 30.0 to 94.9 wt.-%, more preferably from 40.0 to 92.9 wt.-%, still more preferably from 50.0 to 92.9 wt.-%, particularly preferably from 60.0 to 92.9 wt.-% of one or several impact modifiers from 2.0 to 40.0 wt.-%, preferably from 5.0 to 30.0 wt.-%, more preferably from 7.0 to 20.0 wt.-% of particulate silica from 0.1 to 5.0 wt.-% of a triazine type UV absorber from 0.0 to 5.0 wt.-% of one or several UV stabilizers.

The layer B consists of a moulding composition comprising, based on the total weight of the layer B:

from 0.0 to 79.9 wt.-%, preferably from 0.0 to 66.8 wt.-%, more preferably from 0.0 to 54.7 wt.-%, still more preferably from 0.0 to 44.7 wt.-%, particularly preferably from 0.0 to 35.0 wt.-% of a polyalkyl (meth)acrylate from 20.0 to 98.0 wt.-%, preferably from 30.0 to 95.0 wt.-%, more preferably from 40.0 to 93.0 wt.-%, still more preferably from 50.0 to 93.0 wt.-%, particularly preferably from 60.0 to 93.0 wt.-% of one or several impact modifiers from 0.1 to 5.0 wt.-%, preferably from 0.2 to 4.0 wt.-%, more preferably 0.3 to 3.0 wt.-% of a benzotriazole type UV absorber.

Foil Embodiment 4

Figure 3:
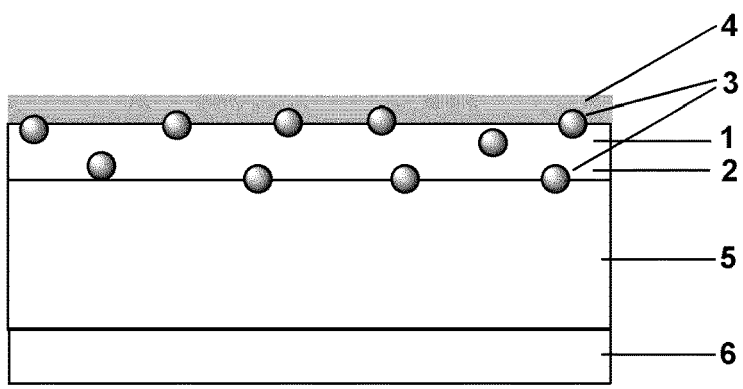
FIG. 3: foil of the present invention comprising the layer A coated with the layer D one side as well as layers B and C

The foil consists of layers D, A, B and C (cf. FIG. 3).

The layer D comprises at least a partially cross-linked polyurethane-(meth)acrylate.

The layer A consists of a moulding composition comprising, based on the total weight of the layer A:

from 0.0 to 77.9 wt.-%, preferably from 0.0 to 64.9 wt.-%, more preferably from 0.0 to 52.9 wt.-%, still more preferably from 0.0 to 42.9 wt.-%, particularly preferably from 0.0 to 32.9 wt.-% of a polyalkyl (meth)acrylate from 20.0 to 97.9 wt.-%, preferably from 30.0 to 94.9 wt.-%, more preferably from 40.0 to 92.9 wt.-%, still more preferably from 50.0 to 92.9 wt.-%, particularly preferably from 60.0 to 92.9 wt.-% of one or several impact modifiers from 2.0 to 40.0 wt.-%, preferably from 5.0 to 30.0 wt.-%, more preferably from 7.0 to 20.0 wt.-% of particulate silica from 0.1 to 5.0 wt.-% of a triazine type UV absorber from 0.0 to 5.0 wt.-% of one or several UV stabilizers.

The layer B consists of a moulding composition comprising, based on the total weight of the layer B:

from 0.0 to 99.8 wt.-%, preferably from 10.0 to 89.8 wt.-% of a polyalkyl (meth)acrylate from 0.0 to 95.0 wt.-%, preferably from 10.0 to 90.0 wt.-% of one or several impact modifiers from 0.1 to 5.0 wt.-%, preferably from 0.2 to 4.0 wt.-%, more preferably 0.3 to 3.0 wt.-% of a benzotriazole type UV absorber from 0.1 to 5.0 wt.-%, preferably from 0.2 to 4.0 wt.-%, more preferably 0.3 to 3.0 wt.-% of a triazine type UV absorber from 0.0 to 5.0 wt.-%, preferably from 0.2 to 4.0 wt.-%, more preferably 0.3 to 3.0 wt.-% of one or several UV stabilizers.

The layer C consists of a moulding composition comprising, based on the total weight of the layer C:

from 0.0 to 77.9 wt.-%, preferably from 0.0 to 64.8 wt.-%, more preferably from 0.0 to 52.7 wt.-%, still more preferably from 0.0 to 42.7 wt.-%, particularly preferably from 0.0 to 33.0 wt.-% of a polyalkyl (meth)acrylate from 20.0 to 98.0 wt.-%, preferably from 30.0 to 95.0 wt.-%, more preferably from 40.0 to 93.0 wt.-%, still more preferably from 50.0 to 93.0 wt.-%, particularly preferably from 60.0 to 93.0 wt.-% of one or several impact modifiers from 0.1 to 5.0 wt.-%, preferably from 0.2 to 4.0 wt.-%, more preferably 0.3 to 3.0 wt.-% of a benzotriazole type UV absorber from 2.0 to 40.0 wt.-%, preferably from 5.0 to 35.0 wt.-%, more preferably from 7.0 to 30.0 wt.-% of an adhesion-promoting copolymer comprising, based on the weight of the adhesion-promoting copolymer:
  (i) from 70.0 to 95.0 wt.-% methyl methacrylate;
  (ii) from 0.5 to 15.0 wt.-% maleic anhydride; and
  (iii) from 0.0 to 25.0 wt.-% of other vinyl-copolymerizable monomers having no functional groups other than the vinyl function, based on the weight of the adhesion-promoting copolymer.

Foil Embodiment 5

The foil consists of layers D, A, B and C (cf. FIG. 3).

The layer D comprises at least a partially cross-linked polyurethane-(meth)acrylate.

The layer A consists of a moulding composition comprising, based on the total weight of the layer A:
- from 0.0 to 77.9 wt.-%, preferably from 0.0 to 64.9 wt.-%, more preferably from 0.0 to 52.9 wt.-%, still more preferably from 0.0 to 42.9 wt.-%, particularly preferably from 0.0 to 32.9 wt.-% of a polyalkyl (meth)acrylate
- from 20.0 to 97.9 wt.-%, preferably from 30.0 to 94.9 wt.-%, more preferably from 40.0 to 92.9 wt.-%, still more preferably from 50.0 to 92.9 wt.-%, particularly preferably from 60.0 to 92.9 wt.-% of one or several impact modifiers
- from 2.0 to 40.0 wt.-%, preferably from 5.0 to 30.0 wt.-%, more preferably from 7.0 to 20.0 wt.-% of particulate silica
- from 0.1 to 5.0 wt.-% of a triazine type UV absorber
- from 0.0 to 5.0 wt.-% of one or several UV stabilizers.

The layer B consists of a moulding composition comprising, based on the total weight of the layer B:
- from 0.0 to 99.8 wt.-%, preferably from 10.0 to 89.8 wt.-% of a polyalkyl (meth)acrylate
- from 0.0 to 95.0 wt.-%, preferably from 10.0 to 90.0 wt.-% of one or several impact modifiers
- from 0.1 to 5.0 wt.-%, preferably from 0.2 to 4.0 wt.-%, more preferably 0.3 to 3.0 wt.-% of a benzotriazole type UV absorber
- from 0.1 to 5.0 wt.-%, preferably from 0.2 to 4.0 wt.-%, more preferably 0.3 to 3.0 wt.-% of a triazine type UV absorber
- from 0.0 to 5.0 wt.-%, preferably from 0.2 to 4.0 wt.-%, more preferably 0.3 to 3.0 wt.-% of one or several UV stabilizers.

The layer C consists of a moulding composition comprising, based on the total weight of the layer C:
- from 0.0 to 77.9 wt.-% of a polyalkyl (meth)acrylate
- from 20.0 to 97.9 wt.-% of one or several impact modifiers
- from 2.0 to 40.0 wt.-% of particulate silica
- from 0.1 to 5.0 wt.-% of a benzotriazole type UV absorber
- from 0.0 to 5.0 wt.-% of one or several UV stabilizers.

The composition of the layers A, B, C and D will be described in the following in a greater detail.

Layer A

The foil of the present invention comprises a layer A consisting of a moulding composition in which silica particles are substantially uniformly dispersed in an impact-modified polyalkyl (meth)acrylate matrix. The content of impact modified polyalkyl (meth)acrylate in the layer A is at least 50 wt.-%, preferably at least 60 wt.-%, more preferably at least 70 wt.-%, yet even more preferably at least 80 wt.-%, particularly preferred at least 85 wt.-%, based on the weight of the layer A. Typically, the polymer matrix does not comprise any fluoropolymers.

According to the present invention, presence of one or several impact modifiers in the moulding composition of the layer A is essential to ensure a good tear resistance of the foil and excellent adhesive properties. Hence, the layer A comprises from 20.0 to 98.0 wt.-%, preferably from 30.0 to 95.0 wt.-%, more preferably from 40.0 to 93.0 wt.-%, still more preferably from 50.0 to 93.0 wt.-%, particularly preferably from 60.0 to 93.0 wt.-% of one or several impact modifiers, based on the weight of the layer A. Preferably, the amount of the rubbery content of the one or several impact modifiers in the moulding composition of the layer A is from 6.0 to 35.0 wt.-%, preferably from 10.0 to 30.0 wt.-%, more preferably from 12.0 to 25.0 wt.-%, still more preferably from 15.0 to 20.0 wt.-%, particularly preferably from 60.0 to 93.0 wt.-% of one or several impact modifiers, based on the weight of the layer A. Accordingly, the content of polyalkyl (meth)acrylate in the moulding composition of the layer A may range from 0.0 to 78.0 wt.-%, preferably from 0.0 to 65.0 wt.-%, more preferably from 0.0 to 53.0 wt.-%, still more preferably from 0.0 to 43.0 wt.-%, particularly preferably from 0.0 to 33.0 wt.-%, based on the weight of the layer A.

The moulding composition of the layer A may comprise, based on the total weight of the layer A:
- from 0.0 to 78.0 wt.-% of a polyalkyl (meth)acrylate
- from 20.0 to 98.0 wt.-% of one or several impact modifiers
- from 2.0 to 40.0 wt.-% of particulate silica
- from 0.0 to 38.0 wt.-% of a fluoropolymer
- from 0.0 to 5.0 wt.-% of one or several UV absorbers
- from 0.0 to 5.0 wt.-% of one or several UV stabilizers;

preferably
- from 0.0 to 65.0 wt.-% of a polyalkyl (meth)acrylate
- from 30.0 to 95.0 wt.-% of one or several impact modifiers
- from 5.0 to 30.0 wt.-% of particulate silica
- from 0.0 to 5.0 wt.-% of one or several UV absorbers
- from 0.0 to 5.0 wt.-% of one or several UV stabilizers;

more preferably
- from 0.0 to 53.0 wt.-% of a polyalkyl (meth)acrylate
- from 40.0 to 93.0 wt.-% of one or several impact modifiers
- from 7.0 to 20.0 wt.-% of particulate silica
- from 0.0 to 5.0 wt.-% of one or several UV absorbers
- from 0.0 to 5.0 wt.-% of one or several UV stabilizers;

still more preferably
- from 0.0 to 43.0 wt.-% of a polyalkyl (meth)acrylate
- from 50.0 to 93.0 wt.-% of one or several impact modifiers
- from 7.0 to 20.0 wt.-% of particulate silica
- from 0.0 to 5.0 wt.-% of one or several UV absorbers
- from 0.0 to 5.0 wt.-% of one or several UV stabilizers;

particularly preferably
- from 0.0 to 33.0 wt.-% of a polyalkyl (meth)acrylate
- from 60.0 to 93.0 wt.-% of one or several impact modifiers
- from 7.0 to 20.0 wt.-% of particulate silica
- from 0.0 to 5.0 wt.-% of one or several UV absorbers
- from 0.0 to 5.0 wt.-% of one or several UV stabilizers.

The inventors further found that the adhesion-enhancing effect of particulate silica in the layer A may be additionally enhanced by using particulate silica in combination with an adhesion-promoting copolymer. In this embodiment, the moulding composition of the layer A may comprise, based on the total weight of the layer A:
- from 0.0 to 76.0 wt.-% of a polyalkyl (meth)acrylate
- from 20.0 to 96.0 wt.-% of one or several impact modifiers
- from 2.0 to 20.0 wt.-% of particulate silica
- from 2.0 to 20.0 wt.-% of an adhesion-promoting copolymer comprising, based on the weight of the adhesion-promoting copolymer:
  (i) from 70.0 to 99.5 wt.-% methyl methacrylate
  (ii) from 0.5 to 15.0 wt.-% of an adhesion-promoting monomer; and (iii) from 0.0 to 25.0 wt.-% of other vinyl-copolymerizable monomers having no functional groups other than the vinyl function
from 0.0 to 5.0 wt.-% of one or several UV absorbers
from 0.0 to 5.0 wt.-% of one or several UV stabilizers;
preferably
from 0.0 to 62.0 wt.-% of a polyalkyl (meth)acrylate
from 30.0 to 92.0 wt.-% of one or several impact modifiers
from 4.0 to 25.0 wt.-% of particulate silica
from 4.0 to 25.0 wt.-% of an adhesion-promoting copolymer comprising, based on the weight of the adhesion-promoting copolymer:
  (i) from 70.0 to 99.5 wt.-% methyl methacrylate
  (ii) from 0.5 to 15.0 wt.-% of an adhesion-promoting monomer; and
  (iii) from 0.0 to 25.0 wt.-% of other vinyl-copolymerizable monomers having no functional groups other than the vinyl function;
from 0.0 to 5.0 wt.-% of one or several UV absorbers
from 0.0 to 5.0 wt.-% of one or several UV stabilizers;
more preferably
from 0.0 to 50.0 wt.-% of a polyalkyl (meth)acrylate
from 40.0 to 90.0 wt.-% of one or several impact modifiers
from 5.0 to 20.0 wt.-% of particulate silica
from 5.0 to 20.0 wt.-% of an adhesion-promoting copolymer comprising, based on the weight of the adhesion-promoting copolymer:
  (i) from 70.0 to 99.5 wt.-% methyl methacrylate
  (ii) from 0.5 to 15.0 wt.-% of an adhesion-promoting monomer; and
  (iii) from 0.0 to 25.0 wt.-% of other vinyl-copolymerizable monomers having no functional groups other than the vinyl function
from 0.0 to 5.0 wt.-% of one or several UV absorbers
from 0.0 to 5.0 wt.-% of one or several UV stabilizers;
still more preferably
from 0.0 to 40.0 wt.-% of a polyalkyl (meth)acrylate
from 50.0 to 90.0 wt.-% of one or several impact modifiers
from 5.0 to 20.0 wt.-% of particulate silica
from 5.0 to 20.0 wt.-% of an adhesion-promoting copolymer comprising, based on the weight of the adhesion-promoting copolymer:
  (i) from 70.0 to 99.5 wt.-% methyl methacrylate
  (ii) from 0.5 to 15.0 wt.-% of an adhesion-promoting monomer; and
  (iii) from 0.0 to 25.0 wt.-% of other vinyl-copolymerizable monomers having no functional groups other than the vinyl function;
from 0.0 to 5.0 wt.-% of one or several UV absorbers
from 0.0 to 5.0 wt.-% of one or several UV stabilizers;
particularly preferably
from 0.0 to 30.0 wt.-% of a polyalkyl (meth)acrylate
from 60.0 to 90.0 wt.-% of one or several impact modifiers
from 5.0 to 20.0 wt.-% of particulate silica
from 5.0 to 20.0 wt.-% of an adhesion-promoting copolymer comprising, based on the weight of the adhesion-promoting copolymer:
  (i) from 70.0 to 99.5 wt.-% methyl methacrylate
  (ii) from 0.5 to 15.0 wt.-% of an adhesion-promoting monomer; and
  (iii) from 0.0 to 25.0 wt.-% of other vinyl-copolymerizable monomers having no functional groups other than the vinyl function;
from 0.0 to 5.0 wt.-% of one or several UV absorbers
from 0.0 to 5.0 wt.-% of one or several UV stabilizers.

Furthermore, chemical resistance and impact resistance of the layer A can be even further improved if the layer A additionally comprises minor amounts of a fluoropolymer. Accordingly, in some embodiments the polymer matrix of the layer A may comprise at least one fluoropolymer e.g. PVDF, wherein the content of the fluoropolymer is typically from 0.0 to 38.0 wt.-%, preferably from 0.0 to 28.0 wt.-%, more preferably from 0.0 to 18.0 wt.-%, based on the weight of the layer A.

Layer D

The foil of the present invention comprises a coating layer D adjacent to the layer A. Due to adhesion promoting effect of the silica particles in the layer A, the coating layer D can be advantageously uniformly applied as a liquid coating composition, preferably followed by a subsequent at least partial curing. The coating layer D may comprise at least a partially cross-linked material selected from cross-linked polyurethanes, cross-linked polyurethane-(meth)acrylates, cross-linked poly(meth)acrylates or a mixture thereof.

The coating layer D can be applied onto the layer A as a coating by means of known processes, e.g. by means of rollers. The coating layer D is preferably applied such that a closed film of the coating composition is formed on the layer A. The amount applied is preferably in the range of 20 to 150 g/m$^2$, especially preferred in the range of 50 to 100 g/m$^2$.

The composition of the layer D will be described in detail below.

Layer B

The foil the present invention may further optionally comprise a layer B which is typically directly adjacent to the layer A (cf. FIG. 2). The content of impact modified polyalkyl (meth)acrylate in the layer B is at least 50 wt.-%, preferably at least 60 wt.-%, more preferably at least 70 wt.-%, yet even more preferably at least 80 wt.-%, still more preferably at least 90 wt.-%, particularly preferably at least 95 wt.-%, based on the weight of the layer B. The layer B may optionally comprise at least one fluoropolymer such as PVDF. Furthermore, the composition of the layer B typically differs from the composition of the layer A. In particular, although the layer B may comprise small amounts of particulate silica, particulate silica is usually not present in the layer B.

In one aspect of the present invention, the composition of the layer B is as follows, based on the total weight of the layer B:
from 0.0 to 100.0 wt.-%, preferably from 10.0 to 90.0 wt.-% of a polyalkyl (meth)acrylate
from 0.0 to 95.0 wt.-%, preferably from 10.0 to 90.0 wt.-% of one or several impact modifiers
from 0.0 to 40.0 wt.-%, preferably from 0.0 to 30.0 wt.-%, more preferably from 0.0 to 20.0 wt.-% of a fluoropolymer
from 0.0 to 5.0 wt.-%, preferably from 0.2 to 4.0 wt.-%, more preferably 0.3 to 3.0 wt.-% of one or several UV absorbers
from 0.0 to 5.0 wt.-%, preferably from 0.2 to 4.0 wt.-%, more preferably 0.3 to 3.0 wt.-% of one or several UV stabilizers; and
from 0.0 to 20.0 wt.-%, preferably from 0.0 to 10.0 wt.-% of an adhesion-promoting copolymer comprising
  (i) from 70.0 to 95.0 wt.-% methyl methacrylate;
  (ii) from 0.5 to 15.0 wt.-% of an adhesion-promoting monomer; and (iii) from 0.0 to 25.0 wt.-% of other vinyl-copolymerizable monomers having no functional groups other than the vinyl function, based on the weight of the copolymer.

Preferably, the polyalkyl (meth)acrylate in the layer B is PMMA as described below and the fluoropolymer, if present, is PVDF. Furthermore, depending on the substrate on which the foil is applied, the layer B may also be substantially free of the adhesion-promoting copolymer.

Layer C

In addition to the layers D, A and B described above, the foil of the present invention may optionally comprise an adhesion-promoting layer C, so that the layer B is located between the layer A and the layer C. In this embodiment the layer C acts as an adhesion-promoting layer and therefore necessarily comprises particulate silica, an adhesion-promoting copolymer or a combination thereof. In general, if the multilayer foil comprises the layer C, the layer B comprises less than 3.0 wt.-%, preferably less than 1.0 wt.-%, based on the weight of the layer B, of the adhesion-promoting copolymer.

In order to achieve an excellent adhesion of the foil on substrates such as HPL the cumulative content of particulate silica and the adhesion-promoting copolymer in the layer C is chosen to be at least 2.0 wt.-%, preferably at least 4.0 wt.-%, more preferably at least 6.0 wt.-%, yet even more preferably at least 8.0 wt.-%, and the content of impact modified polyalkyl (meth)acrylate in the layer C is at least 60 wt.-%, preferably at least 60 wt.-%, more preferably at least 70 wt.-%, yet even more preferably at least 80 wt.-%, based on the weight of the layer C.

In general, the layer C consists of a moulding composition comprising
- from 0.0 to 78.0 wt.-% of a polyalkyl (meth)acrylate
- from 20.0 to 98.0 wt.-% of one or several impact modifiers
- from 0.0 to 40.0 wt.-% of a fluoropolymer
- from 0.0 to 40.0 wt.-% of particulate silica
- from 0.0 to 40.0 wt.-% of an adhesion-promoting copolymer comprising, based on the weight of the adhesion-promoting copolymer:
    (i) from 70.0 to 99.5 wt.-% methyl methacrylate
    (ii) from 0.5 to 15.0 wt.-% of an adhesion-promoting monomer; and
    (iii) from 0.0 to 25.0 wt.-% of other vinyl-copolymerizable monomers having no functional groups other than the vinyl function
- from 0.0 to 5.0 wt.-% of one or several UV absorbers
- from 0.0 to 5.0 wt.-% of one or several UV stabilizers.

In one embodiment, the layer C comprises particulate silica and no adhesion-promoting copolymer. Hence, in this embodiment, the composition of the layer C substantially corresponds to that of the layer A. The layer C consists of a moulding composition comprising
- from 0.0 to 78.0 wt.-%, preferably from 0.0 to 65.0 wt.-%, more preferably from 0.0 to 53.0 wt.-%, still more preferably from 0.0 to 43.0 wt.-%, particularly preferably from 0.0 to 33.0 wt.-% of a polyalkyl (meth)acrylate
- from 20.0 to 98.0 wt.-%, preferably from 30.0 to 95.0 wt.-%, more preferably from 40.0 to 93.0 wt.-%, still more preferably from 50.0 to 93.0 wt.-%, particularly preferably from 60.0 to 93.0 wt.-% of one or several impact modifiers
- from 2.0 to 40.0 wt.-%, preferably from 5.0 to 30.0 wt.-%, more preferably from 7.0 to 20.0 wt.-% of particulate silica
- from 0.0 to 5.0 wt.-% of one or several UV absorbers
- from 0.0 to 5.0 wt.-% of one or several UV stabilizers.

In yet a further embodiment, the layer C comprises an adhesion-promoting copolymer and no particulate silica. Hence, in this embodiment, the layer C consists of a moulding composition comprising
- from 0.0 to 78.0 wt.-%, preferably from 0.0 to 65.0 wt.-%, more preferably from 0.0 to 53.0 wt.-%, still more preferably from 0.0 to 43.0 wt.-%, particularly preferably from 0.0 to 33.0 wt.-% of a polyalkyl (meth)acrylate
- from 20.0 to 98.0 wt.-%, preferably from 30.0 to 95.0 wt.-%, more preferably from 40.0 to 93.0 wt.-%, still more preferably from 50.0 to 93.0 wt.-%, particularly preferably from 60.0 to 93.0 wt.-% of one or several impact modifiers
- from 2.0 to 40.0 wt.-%, preferably from 5.0 to 35.0 wt.-%, more preferably from 7.0 to 30.0 wt.-% of an adhesion-promoting copolymer comprising, based on the weight of the adhesion-promoting copolymer:
    (i) from 70.0 to 99.5 wt.-% methyl methacrylate
    (ii) from 0.5 to 15.0 wt.-% of an adhesion-promoting monomer; and
    (iii) from 0.0 to 25.0 wt.-% of other vinyl-copolymerizable monomers having no functional groups other than the vinyl function
- from 0.0 to 5.0 wt.-% of one or several UV absorbers
- from 0.0 to 5.0 wt.-% of one or several UV stabilizers.

In this embodiment, the layer C comprises from 2.0 to 40.0 wt.-%, preferably from 5.0 to 35.0 wt.-%, more preferably from 7.0 to 30.0 wt.-% of an adhesion-promoting copolymer, based on the weight of the layer C. Accordingly, the amount of the adhesion-promoting monomer in the moulding composition of the layer C is typically from 0.1 to 10.0 wt.-%, preferably from 0.5 to 8.0 wt.-%, more preferably from 1.0 to 5.0 wt.-%, based on the weight of the layer C.

In yet a further embodiment, the layer C comprises an adhesion-promoting copolymer in combination with particulate silica. Hence, in this embodiment, the layer C consists of a moulding composition comprising
- from 0.0 to 78.0 wt.-%, preferably from 0.0 to 65.0 wt.-%, more preferably from 0.0 to 53.0 wt.-%, still more preferably from 0.0 to 43.0 wt.-%, particularly preferably from 0.0 to 33.0 wt.-% of a polyalkyl (meth)acrylate
- from 20.0 to 98.0 wt.-%, preferably from 30.0 to 95.0 wt.-%, more preferably from 40.0 to 93.0 wt.-%, still more preferably from 50.0 to 93.0 wt.-%, particularly preferably from 60.0 to 93.0 wt.-% of one or several impact modifiers
- from 1.0 to 20.0 wt.-%, preferably from 2.0 to 17.0 wt.-%, more preferably from 4.0 to 15.0 wt.-% of particulate silica
- from 1.0 to 20.0 wt.-%, preferably from 3.0 to 20.0 wt.-%, more preferably from 7.0 to 15.0 wt.-% of an adhesion-promoting copolymer comprising, based on the weight of the adhesion-promoting copolymer:
    (i) from 70.0 to 99.5 wt.-% methyl methacrylate
    (ii) from 0.5 to 15.0 wt.-% of an adhesion-promoting monomer; and
    (iii) from 0.0 to 25.0 wt.-% of other vinyl-copolymerizable monomers having no functional groups other than the vinyl function
- from 0.0 to 5.0 wt.-% of one or several UV absorbers
- from 0.0 to 5.0 wt.-% of one or several UV stabilizers.

In this embodiment, the layer C comprises from 1.0 to 20.0 wt.-%, preferably from 3.0 to 20.0 wt.-%, more preferably from 7.0 to 15.0 wt.-% of an adhesion-promoting copolymer, based on the weight of the layer C. Accordingly, the amount of the adhesion-promoting monomer in the moulding composition of the layer C is typically from 0.05 to 5.0 wt.-%, preferably from 0.25 to 4.0 wt.-%, more preferably from 0.5 to 2.5 wt.-%, based on the weight of the layer C.

Presence of one or several impact modifiers in the moulding composition of the layer C is essential to ensure a good tear resistance of the foil and excellent adhesive properties. Hence, the layer C comprises from 20.0 to 98.0 wt.-%, preferably from 30.0 to 95.0 wt.-%, more preferably from 40.0 to 93.0 wt.-%, still more preferably from 50.0 to 93.0 wt.-%, particularly preferably from 60.0 to 93.0 wt.-% of one or several impact modifiers, based on the weight of the layer C. Preferably, the amount of the rubbery content of the one or several impact modifiers in the moulding composition of the layer C is from 6.0 to 35.0 wt.-%, preferably from 10.0 to 30.0 wt.-%, more preferably from 12.0 to 25.0 wt.-%, still more preferably from 15.0 to 20.0 wt.-%, particularly preferably from 60.0 to 93.0 wt.-% of one or several impact modifiers, based on the weight of the layer C.

Description of Individual Components of Layers A-D

Silica Particles

The content of the particulate silica dispersed in the polymeric matrix of the layer is usually from 2.0 to 40.0 wt.-%, more preferred from 5.0 to 30.0 wt.-%, and particularly preferred from 7.0 to 20.0 wt.-%, based on the total weight of the corresponding layer.

The presence of particulate silica in the multilayer foil of the present invention serves several purposes. It is due to the presence of silica particles in the specified amounts that the layer A of the foil has a rough and hydrophilic surface and can be uniformly coated with a liquid coating composition. The coating may be applied onto the surface of the layer A substantially by any method known in the prior art such as immersion methods, spraying methods, coating with a doctor knife, flow-coating methods, and application by rollers or by rolls. The coating can be applied onto the foil in a particularly easy and cost-efficient manner by using roll-to-roll processing. Roll-to-roll manufacturing technique is well-known to the skilled person and involves a continuous processing of a foil as it is transferred between two moving rolls in a continuous manner. In a preferred embodiment, the coating of the foil with the intermediate layer takes place at a temperature ranging from 60° C. to 90° C. at a speed between 1 m/min to 70 m/min, more preferably between 10 m/min and 30 m/min.

Additionally, the layer comprising particulate silica has a surprisingly high adhesion to materials such as melamine resin-based HPLs. Therefore, the multilayer foil of the present invention can be directly used for lamination of various substrates such as HPLs by applying the foil with layer facing the substrate. Importantly, the presence of copolymers comprising copolymers of acid anhydrides is no longer essential in this embodiment.

To achieve an optimal balance between good handling properties of the multilayer foil and good adhesive properties of the layer it showed to be advantageous to ensure that the content, in wt.-%, of one or several impact modifiers $n_{im}$ in the layer obeys the following relationship:

$$0.01 * n_{im} \leq n_{si} \leq 0.4 * n_{im}$$

$n_{si}$ being the content, in wt.-%, of particulate silica in the layer.

If the content of particulate silica $n_{si}$ in the layer is lower than $0.01 * n_{im}$ the multilayer foil, in principle, still will be suitable for the desired purposes. However, adhesion of various liquid coatings to the layer A and adhesion of the layer to some substrates may become diminished to some extent.

On the other hand, if the content of particulate silica $n_{si}$ in the layer A is higher than $0.4 * n_{im}$ brittleness of the layer will increase. Consequently, the multilayer foil of the present invention will be more difficult to handle.

Furthermore, for the sake of achieving an even better balance between adhesion properties of the layer and its brittleness it is particularly advantageous that the content, in wt.-%, of one or several impact modifiers $n_{im}$ in the layer obeys the following relationship:

$$0.03 * n_{im} \leq n_{si} \leq 0.3 * n_{im}$$

wherein it is particularly advantageous that the content, in wt.-%, of one or several impact modifiers $n_{im}$ in the layer obeys the following relationship:

$$0.05 * n_{im} \leq n_{si} \leq 0.2 * n_{im}$$

$n_{si}$ being the content, in wt.-%, of particulate silica in the layer.

The choice of particulate silica for use in the present invention is not particularly limited and pyrogenic as well as precipitated silicas may be advantageously used. Nonetheless, it showed to be particularly advantageous in terms of adhesion-promoting properties to select particulate silica having a specific surface area, measured by BET method, norm ISO 9277, of more than 200 m$^2$/g, preferably more than 300 m$^2$/g, more preferably more than 400 m$^2$/g, even more preferably more than 500 m$^2$/g. Still, the specific surface area of particulate silica is preferably not higher than 850 m$^2$/g.

It has additionally been found that a high dibutylphthalate (DBP) absorption of the silicas for use in the present invention is of benefit in terms of their adhesion-promoting properties. The silicas for use in the present invention preferably have a DBP absorption of 100 to 500 g/100 g. More preferred are DBP absorptions ranging from 150 to 450 g/100 g, even more preferred 150 to 400 g/100 g. The DBP absorption can be determined in accordance with method ASTM D6854-12a.

In a preferred embodiment, the silica particles have a weight-average particle diameter $d_{50}$ ranging between 1.0 μm and 20.0 μm, more preferably between 2.0 μm and 15.0 μm. The weight-average particle diameter $d_{50}$ can be determined by a method known to a skilled person, e.g. by laser diffraction method according to the norm DIN ISO 13320-1 upon using a commercially available instrument such as LS 13 320 Laser Diffraction Particle Size Analyzer from Beckman Coulter Inc.

Preferably, silica particles show a 45 μm screen residue, measured according to ISO 3262-19, of not more than 0.1 wt.-%, more preferably not more than 0.01 wt.-%, i.e. substantially no agglomerates with a particle size larger than 45 μm are present. This allows silica particles to be distributed in the matrix of poly(meth)acrylate foil in a particularly homogeneous manner without large filler agglomerates being present so that the resulting foil shows a substantially uniform appearance and has excellent mechanical properties. Presence of substantial amounts of larger agglomerates of silica particles in the layer is disadvantageous, since such agglomerates tend to initiate foil cracks thereby reducing the initial tear strength at a random position of the foil.

Particulate silica for use in the present invention typically has a $SiO_2$ content, based on ISO 3262-19, of not less than 95 wt.-%, more preferably not less than 96 wt.-%, even more preferably not less than 97 wt.-%. Furthermore, use of hydrophilic silica showed to be particularly advantageous in terms of adhesion-promoting properties. By "hydrophilic" silicas are meant those whose surface shows hydrophilic behaviour when incorporated by stirring into water, i.e. those whose surface is completely wetted by water and therefore has a contact angle at 23±2° C. with respect to water of less than 90°. A simple method to determine whether a silica is "hydrophilic" is by stirring it into water. For example, 0.5 g of silica are added to a beaker containing 200 ml of pure water, at a temperature of about 23±2° C., the mixture is vigorously agitated (about 100 rpm, using a 3 cm diameter impeller). It can be said that the silica is "hydrophilic" if the silica disperses in the water, i.e. the silica is not floating on the surface, this can be evaluated with the naked eye.

Hydrophilic precipitated silicas and hydrophilic pyrogenic silicas are also known as non-modified silicas. Hydrophilic silicas have less than 10%, typically less than 5% of silanol groups on their surface substituted with hydrophobic functional groups such as alkoxy groups. In contrast, hydrophobic silicas are obtained from hydrophilic silicas by rendering then hydrophobic by treatment with halogenated silanes, alkoxysilanes or silazanes. Hydrophobic silicas differ from hydrophilic starting silicas by, inter alia, lower silanol group density and smaller water vapor adsorption.

The inventors found that the silanol group density has a strong effect on the adhesion-promoting properties of the particulate silica. Without wishing to be bound a theory, the inventors believe that the silanol groups on the surface of the particulate silica can chemically interact with the material of the coating layer D, in particular with isocyanate-type hardeners. The silanol groups on the surface of the particulate silica are also likely to undergo interactions with various substrate materials, if the layer comprising particulate silica is used as an adhesion-promoting layer. Typically, the silanol group density should be not lower than 0.5 $SiOH/nm^2$, more preferably from 0.5 to 20.0 $SiOH/nm^2$, even more preferably from 1.0 to 15.0 $SiOH/nm^2$, even more preferably from 1.5 to 10.0 $SiOH/nm^2$.

For the determination of the silanol group density, the number of silanol groups on the surface of the silica is first determined by means of lithium aluminium hydride. The silanol group concentration alone, however, is not meaningful, since hydrophilic precipitated silicas with a high surface area generally have a higher absolute number of silanol groups than do hydrophilic precipitated silicas with a low surface area. Consequently it is necessary to relate the number of silanol groups to the surface area of the silica. A suitable surface area for this purpose is the BET surface area, since this describes the surface which is available even to relatively small molecules such as water.

The silanol group density can be determined according to the following procedure:

First, the moisture content of a silica sample is determined by drying for 2 hours at 105° C. according to ISO 787-2. Thereafter 2-4 g of the sample (to an accuracy of 1 mg) are transferred to a pressure-tight glass apparatus (glass flask with dropping funnel) with a pressure measurement means attached. In this apparatus the sample is dried under reduced pressure (<1 hPa) at 120° C. for 1 h. At room temperature then, approximately 40 ml of a degassed 2 wt.-% solution of lithium aluminium hydride in diglyme is added dropwise from the dropping funnel. If appropriate, further solution is added dropwise until no further increase in pressure is observed. The increase in pressure as a result of the hydrogen evolved when the lithium aluminium hydride reacts with the silanol groups of the silica is determined by way of pressure measurement (with the volume known as a result of calibration of the apparatus prior to measurement) to an accuracy of 1 hPa. From the increase in pressure it is possible, by calculation using the general gas equation, to work back to the silanol group concentration of the silica, taking into account the moisture content of the silica. The influence of the vapor pressure of the solvent should be corrected correspondingly. The silanol group density is calculated as follows:

Silanol group density=silanol group concentration/ BET surface area

In general, tamped density of the employed particulate silica has an effect on adhesion promoting properties of the corresponding layer. For this reason, foils with particularly advantageous adhesion promoting properties are obtained with particulate silicas having tamped density, measured according to DIN EN ISO 787-11, from 10 g/l to 800 g/l, more preferably from 40 g/l to 500 g/l, even more preferably from 80 g/l to 300 g/l.

Use of precipitated silica, as for example described in Ullmann's Encyclopaedia of Industrial Chemistry, 5th edition, vol. A23, p. 642-647, is particularly preferred. Precipitated silicas may have specific surface areas, measured by BET method, up to 850 $m^2/g$ and are obtained by reaction of at least one silicate, preferably of an alkali metal silicate and/or alkaline earth metal silicate, with at least one acidifying agent, preferably at least one mineral acid. In contrast to silica gels (see Ullmann's Encyclopaedia of Industrial Chemistry, 5th edition, vol. A23, p. 629-635), precipitated silicas do not consist of a homogeneous three-dimensional $SiO_2$ network, but of individual aggregates and agglomerates. A particular feature of precipitated silica is the high proportion of so-called internal surface area, which is reflected in a very porous structure with micro- and mesopores.

Precipitated silicas for use in the present invention include inter alia SIPERNAT® 160, SIPERNAT® 310, SIPERNAT® 320, SIPERNAT® 320DS, SIPERNAT® 325C, SIPERNAT® 350, SIPERNAT® 360, SIPERNAT® 383DS, SIPERNAT® 500 LS, SIPERNAT® 570, SIPERNAT® 700, SIPERNAT® 22, SIPERNAT® 22S, SIPERNAT® 50LOS, SIPERNAT® 22, Tixosil® 38, Tixosil® 38A, Tixosil® 38D, Tixosil® 38D, Tixosil® 38X, Tixosil® 38AB, Tixosil® 39, Tixosil® 43, Tixosil® 331, Tixosil® 365, Zeoosil® 175BB, Zeosil® 39, Zeosil® 39AB, Zeosil® 45, Flo-Gard™ FF 320, Flo-Gard™ FF 330, Flo-Gard™ FF 350, Flo-Gard™ FF 370, Flo-Gard™ FF 390, Flo-Gard™ SP, Flo-Gard™ SP-D, 213, ABS, HOA, HOA-D, SC 50-D, 60-M, 72, Hi-Sil™ T-600, T650, 700, Hubersil® 5170, Hubersorb® 250, Hubersorb® 250 NF, Hubersorb® 5121, Hubersorb® 600, Hubersorb® E, ZEOFREE® 110 SD, ZEOFREE®® 153, ZEOFREE® 153 B, ZEOFREE® 182, ZEOFREE® 51, ZEOFREE® 5111, ZEOFREE® 5112, ZEOFREE® 5161, ZEOFREE® 5161A, ZEOFREE® 5161 S, ZEOFREE® 5175B, ZEOFREE® 5181, ZEOFREE® 5183, ZEOFREE® 80, ZEOFREE® 684.

Precipitated silicas differ from pyrogenic silicas, which may also be used in the layers A and C and are known as AEROSIL® (see Ullmann's Encyclopaedia of Industrial Chemistry, 5th edition, vol. A23, p. 635-642). Pyrogenic silicas are obtained by means of flame hydrolysis from silicon tetrachloride. Owing to a completely different preparation process, pyrogenic silicas, among other properties, have different surface properties from precipitated silicas. This is expressed, for example, in a lower silanol group density on their surface. Moreover, the production of pyrogenic silicas does not give rise to any polyvalent anions.

Suitable pyrogenic silicas of AEROSIL® type from Evonik Industries AG are e.g. AEROSIL® 90, AEROSIL® 130, AEROSIL® 150, AEROSIL® 200, AEROSIL® 300, AEROSIL® 380, AEROSIL® Ox 50 but Cab-O-Sil® M5, Cab-O-Sil® EH5, Cab-O-Sil® S 17, HDK T40, HDK N20, HDK N20E can also be used.

Polyalkyl (Meth)Acrylates

Polyalkyl (meth)acrylates are usually obtained by free-radical polymerization of mixtures which typically comprise an alkyl (meth)acrylate, typically methyl methacrylate (a), and at least one further (meth)acrylate (b). These mixtures generally comprise at least 50 wt.-%, preferably at least 60 wt.-%, particularly preferably at least 80 wt.-%, and even more preferably at least 90 wt.-%, based on the weight of the monomers, of methyl methacrylate (a). The amount of methyl methacrylate (a) generally used is from 50.0 wt.-% to 99.9 wt.-%, preferably from 80.0 wt.-% to 99.0 wt.-% and particularly preferably from 90.0 wt.-% to 99.0 wt.-%, based on the weight of monomers.

These mixtures for production of polyalkyl (meth)acrylates can also comprise other (meth)acrylates (b) copolymerizable with methyl methacrylate (a). The term "(meth)acrylate" as used herein is meant to encompass methacrylates, acrylates and mixtures thereof. (Meth)acrylates may derive from saturated alcohols, e.g. methyl acrylate, ethyl (meth)acrylate, propyl (meth)acrylate, n-butyl (meth)acrylate, tert-butyl (meth)acrylate, isobutyl (meth)acrylate, pentyl (meth)acrylate and 2-ethylhexyl (meth)acrylate; or from unsaturated alcohols, e.g. oleyl (meth)acrylate, 2-propynyl (meth)acrylate, allyl (meth)acrylate, vinyl (meth)acrylate; and also aryl (meth)acrylates, such as benzyl (meth)acrylate or phenyl (meth)acrylate, cycloalkyl (meth)acrylates, such as 3-vinylcyclohexyl (meth)acrylate, bornyl (meth)acrylate; hydroxyalkyl (meth)acrylates, such as 3-hydroxypropyl (meth)acrylate, 3,4-dihydroxybutyl (meth)acrylate, 2-hydroxyethyl (meth)acrylate, 2-hydroxypropyl (meth)acrylate; glycol di(meth)acrylates, such as 1,4-butanediol (meth)acrylate, (meth)acrylates of ether alcohols, e.g. tetrahydrofurfuryl (meth)acrylate, vinyloxyethoxyethyl (meth)acrylate; amides and nitriles of (meth)acrylic acid etc.

The amount of the (meth)acrylic comonomers (b) generally used is from 0.1 wt.-% to 50.0 wt.-%, preferably from 1.0 wt.-% to 20.0 wt.-% and particularly preferably from 1.0 wt.-% to 10.0 wt.-%, based on the weight of monomers, and the compounds here can be used individually or in the form of a mixture.

The polymerization reaction is generally initiated by known free-radical initiators. Among the preferred initiators are inter alia the azo initiators well known to persons skilled in the art, e.g. AIBN and 1,1-azobiscyclohexanecarbonitrile, and peroxy compounds, such as methyl ethyl ketone peroxide, acetylacetone peroxide, dilauryl peroxide, tert-butyl 2-ethylperhexanoate, ketone peroxide, methyl isobutyl ketone peroxide, cyclohexanone peroxide, dibenzoyl peroxide, tert-butyl peroxybenzoate, tert-butylperoxy isopropyl carbonate, 2,5-bis(2-ethylhexanoylperoxy)-2,5-dimethylhexane, tert-butyl 2-ethylperoxyhexanoate, tert-butyl 3,5,5-trimethylperoxyhexanoate, dicumyl peroxide, 1,1-bis(tert-butylperoxy)cyclohexane, 1,1-bis(tert-butylperoxy)-3,3,5-trimethylcyclohexane, cumyl hydroperoxide, tert-butyl hydroperoxide, bis(4-tert-butylcyclohexyl) peroxydicarbonate, or mixtures thereof.

The compositions to be polymerized can comprise not only the methyl methacrylate (a) and the (meth)acrylates (b) described above but also other unsaturated monomers which are copolymerizable with methyl methacrylate and with the abovementioned (meth)acrylates. Among these are inter alia 1-alkenes, such as 1-hexene, 1-heptene; branched alkenes, such as vinylcyclohexane, 3,3-dimethyl-1-propene, 3-methyl-1-diisobutylene, 4-methyl-1-pentene; acrylonitrile; vinyl esters, such as vinyl acetate; styrene, substituted styrenes having an alkyl substituent in the side chain, e.g. α-methylstyrene and α-ethylstyrene, maleic acid derivatives, such as maleic anhydride, methylmaleic anhydride, maleimide, methylmaleimide; and dienes, such as divinylbenzene.

The amount of these comonomers (c) generally used is from 0.0 wt.-% to 10.0 wt.-%, preferably from 0.0 wt.-% to 5.0 wt.-% and particularly preferably from 0.0 wt.-% to 2.0 wt.-%, based on the weight of monomers, and the compounds here can be used individually or in the form of a mixture.

Further preference is given to polyalkyl (meth)acrylates which are obtainable by polymerization of a composition having, as polymerizable constituents:
(a) from 50.0 wt.-% to 99.9 wt.-% of methyl methacrylate,
(b) from 0.1 wt.-% to 50.0 wt.-% of an acrylic acid ester of a C1-C4 alcohol,
(c) from 0.0 wt.-% to 10.0 wt.-% of monomers copolymerizable with the monomers (a) and (b).

In yet a further embodiment, preference is given to polyalkyl (meth)acrylates composed of from 85.0 wt.-% to 99.5 wt. % of methyl methacrylate and from 0.5 wt.-% to 15.0 wt.-% of methyl acrylate, the amounts here being based on 100 wt.-% of the polymerizable constituents. Particularly advantageous copolymers are those obtainable by copolymerization of from 90.0 wt.-% to 99.5 wt.-% of methyl methacrylate and from 0.5 wt.-% to 10.0 wt.-% of methyl acrylate, where the amounts are based on 100 wt.-% of the polymerizable constituents. For instance, the polyalkyl (meth)acrylates may comprise 91.0 wt.-% of methyl methacrylate and 9.0 wt.-% of methyl acrylate, 96.0 wt.-% of methyl methacrylate and 4.0 wt.-% of methyl acrylate or 99.0 wt.-% of methyl methacrylate and 1.0 wt.-% of methyl acrylate. The Vicat softening points VSP (ISO 306:2013, method B50) of said polyalkyl (meth)acrylates is typically at least 90° C., preferably from 95° C. to 112° C.

The weight-average molar mass Mw of the polyalkyl (meth)acrylates is generally in the range from 50 000 g/mol to 300 000 g/mol. Particularly advantageous mechanical properties are obtained from foils with polyalkyl (meth)acrylates having an average molar mass Mw in the range from 50 000 g/mol to 180 000 g/mol, preferably from 80 000 g/mol to 160 000 g/mol, in each case determined by means of GPC against PMMA calibration standards and THF as an eluent. Furthermore, the polyalkyl (meth)acrylates preferably comprises less than 20 wt.-%, more preferably less than 10 wt.-%, still more preferably less than 5 wt.-%, even more preferably less than 3 wt.-%, yet even more preferably less than 1.5 wt.-% of oligomeric PMMA with a weight-average molar mass of from 300 to 1500 g/mol, measured by means of SEC against a PMMA standard.

In a particularly preferred embodiment, the polyalkyl (meth)acrylate is obtainable by polymerization of a composition whose polymerizable constituents comprise, based on the weight of the polymerizable composition:

(a) from 80.0 wt.-% to 99.0 wt.-% of methyl methacrylate, and
(b) from 1.0 wt.-% to 20.0 wt.-% of an acrylic acid ester of a C1-C4 alcohol.

Impact Modifiers

Impact modifiers for use in the present invention per se are well known and may have different chemical compositions and different polymer architectures. The impact modifiers may be cross-linked or thermoplastic. In addition, the impact modifiers may be in particulate form, as core-shell or as core-shell-shell particles. Typically, particulate impact modifiers have an average particle diameter between 20 nm and 500 nm, preferably between 50 nm and 450 nm, more preferably between 100 nm and 400 nm and most preferably between 150 nm and 350 nm. "Particulate impact modifiers" in this context means cross-linked impact modifiers which generally have a core, core-shell, core-shell-shell or core-shell-shell-shell structure. Average particle diameter of particulate impact modifiers can be determined by a method known to a skilled person, e.g. by photon correlation spectroscopy according to the norm DIN ISO 13321:1996.

In the simplest case, the particulate impact modifiers are cross-linked particles obtained by means of emulsion polymerization whose average particle diameter is in the range from 10 nm to 150 nm, preferably from 20 nm to 100 nm, in particular, from 30 nm to 90 nm. These are generally composed of at least 20.0 wt.-%, preferably from 20.0 wt.-% to 99.0 wt.-%, particularly preferably in the range from 30.0 wt.-% to 98.0 wt.-% of butyl acrylate, and from 0.1 wt.-% to 2.0 wt.-%, preferably from 0.5 wt.-% to 1.0 wt.-% of a cross-linking monomer, e.g. a polyfunctional (meth)acrylate, e.g. allyl methacrylate and, if appropriate, other monomers, e.g. from 0.0 wt.-% to 10.0 wt.-%, preferably from 0.5 wt.-% to 5.0% wt.-%, of C1-C4-alkyl methacrylates, such as ethyl acrylate or butyl methacrylate, preferably methyl acrylate, or other vinylically polymerizable monomers, e.g. styrene.

Further preferred impact modifiers are polymer particles which can have core-shell or core-shell-shell structures and are obtained by emulsion polymerization (see, for example, EP-A 0 113 924, EP-A 0 522 351, EP-A 0 465 049 and EP-A 0 683 028). The present invention typically requires suitable average particle diameter of these emulsion polymers in the range from 20 nm and 500 nm, preferably between 50 nm and 450 nm, more preferably between 150 nm and 400 nm and most preferably between 200 nm and 350 nm.

A three-layer or three-phase structure with a core and two shells can prepared as follows. The innermost (hard) shell can, for example, be composed of methyl methacrylate, of small proportions of comonomers, e.g. ethyl acrylate, and of a proportion of cross-linking agent, e.g. allyl methacrylate. The middle (soft) shell can, for example, be composed of a copolymer comprising butyl acrylate and, if appropriate, styrene, while the outermost (hard) shell is the same as the matrix polymer, thus bringing about compatibility and good linkage to the matrix.

The proportion of polybutyl acrylate in the core or in the shell of the impact modifier of a two- or three-layer core-shell structure is decisive for the impact-modifying action and is preferably in the range from 20.0 wt.-% to 99.0 wt.-%, particularly preferably in the range from 30.0 wt.-% to 98.0 wt.-%, even more preferably in the range from 40.0 wt.-% to 97.0 wt.-%, based on the total weight of the impact modifier.

In addition to particulate impact modifiers comprising copolymers of polybutyl acrylate or polybutadiene, use of impact modifiers comprising siloxanes is also possible. However, use of such modifiers is less advantageous, because their presence in the polyalkyl (meth)acrylate foil tends to be disadvantageous for printability of the foil.

Thermoplastic impact modifiers have a different mechanism of action than particulate impact modifiers. They are generally mixed with the matrix material. In the case that domains are formed, as occurs, for example, in the case of use of block copolymers, preferred sizes for these domains, the size of which can be determined, for example, by electron microscopy, correspond to preferred sizes for the core-shell particles.

There are various classes of thermoplastic impact modifiers. One example thereof are aliphatic thermoplastic polyurethanes (TPUs) e.g. Desmopan® products commercially available from Covestro AG. For instance, the TPUs Desmopan® WDP 85784A, WDP 85092A, WDP 89085A and WDP 89051D, all of which have refractive indices between 1.490 and 1.500, are particularly suitable as impact modifiers.

A further class of thermoplastic polymers for use according in the foil of the present invention as impact modifiers are methacrylate-acrylate block copolymers, especially acrylic TPE, which comprises PMMA-poly-n-butyl acrylate-PMMA triblock copolymers, and which are commercially available under the Kurarity® product name by Kuraray. The poly-n-butyl acrylate blocks form nanodomains in the polymer matrix having a size between 10 nm and 20 nm.

In addition to thermoplastic impact modifiers described above, use of thermoplastic impact modifiers comprising PVDF is also possible. However, use of such modifiers in layers A and C is less advantageous, because they tend to impair adhesion-promoting properties of the layers.

Fluoropolymers

Depending on the intended use of the foil of the present invention the fluoropolymer may be selected from polyvinylidene fluoride (PVDF), polyvinylfluoride (PVF), polytetrafluorethylene (PTFE), polyethylenetetrafluoroethylene (ETFE), fluorinated ethylene-propylene (FEP) or a mixture thereof.

The PVDF polymers used in the foil are generally transparent, semicrystalline, thermoplastic fluoroplastics. Advantageously, the PVDF has a high crystalline fusing point. The heat resistance of the foil is particularly high when the crystalline fusing point of the PVDF is at least 150° C. and more preferably at least 160° C. The upper limit of the crystalline fusing point is preferably approximately 175° C., which is equal to the crystalline fusing point of PVDF. It is further preferred that the weight average molecular weight Mw of the PVDF ranges from 50 000 to 300 000 g/mol, more preferably from 80 000 to 250 000 g/mol, even more preferably from 150 000 to 250 000 g/mol as determined by GPC.

The fundamental unit for PVDF is vinylidene fluoride, which is polymerized by means of a specific catalyst to give PVDF in high-purity water under controlled conditions of pressure and of temperature. Vinylidene fluoride is obtainable by way of example from hydrogen fluoride and methylchloroform as starting materials, using chlorodifluoroethane as precursor. In principle, any commercial grade of PVDF such as Kynar® grades produced by Arkema, Dyneon® grades produced by Dyneon, or Solef® grades produced by Solvay is suitable for use in the present invention. For instance, the following commercial products may be employed: Kynar® 720 (vinylidene fluoride content: 100 wt.-%, crystalline fusing point: 169° C.) and Kynar® 710 (vinylidene fluoride content: 100 wt.-%, crystalline fusing point: 169° C.) manufactured by ARKEMA; T850

(vinylidene fluoride content: 100 wt.-%, crystalline fusing point: 173° C.) manufactured by KUREHA Corporation; Solef® 1006 (vinylidene fluoride content: 100 wt.-%, crystalline fusing point: 174° C.) and Solef® 1008 (trade name) (vinylidene fluoride content: 100 wt.-%, crystalline fusing point: 174° C.) manufactured by Solvay Solexis.

PVDF has 3 linkage modes as linkage modes of monomer: head to head linkage; tail to tail linkage; and head to tail linkage, in which the head to head linkage and the tail to tail linkage are referred to as "hetero linkage". The chemical resistance of the layer A is particularly high when the "rate of hetero linkage" in the PVDF is not greater than 10 mol.-%. From the viewpoint of lowering the rate of hetero linkage, the PVDF is preferably a resin produced by suspension polymerization. The rate of hetero linkage can be determined from a peak of a $^{19}$F-NMR spectrum of the PVDF as specified in EP 2 756 950 A1. Typically, the fluoropolymer is not cross-linked and it therefore suitable for thermoplastic processing. The PVDF may include a flatting agent to such a degree that the transparency of the layer A is not deteriorated. As the flatting agent, an organic flatting agent and an inorganic flatting agent can be used.

In one embodiment, the fluoropolymer is a predominantly amorphous, or a microcrystalline PVDF with a haze value smaller than 5. The haze value is measured for this purpose on a pure fluoropolymer (PVDF) foil of thickness 30 μm at 23° C. in accordance with ASTM D1003. Examples of types of PVDF having particularly good suitability with appropriately low haze value are Solef® 9009 from Solvay, T850 from Kureha and Kynar® 9000HD from Arkema.

UV Absorbers and UV Stabilizers

Light stabilizers are well known and are described in detail by way of example in Hans Zweifel, Plastics Additives Handbook, Hanser Verlag, 5th Edition, 2001, p. 141 ff. Light stabilizers are understood to include UV absorbers, UV stabilizers and free-radical scavengers.

UV absorbers can by way of example derive from the group of the substituted benzophenones, salicylic esters, cinnamic esters, oxanilides, benzoxazinones, hydroxyphenylbenzotriazoles, triazines or benzylidenemalonate. The best-known representatives of the UV stabilizers/free-radical scavengers are provided by the group of the sterically hindered amines (hindered amine light stabilizer, HALS).

Preferably, the combination of UV absorbers and UV stabilizers is composed of the following components:
 a UV absorber of benzotriazole type,
 a UV absorber of triazine type,
 a UV stabilizer (HALS compound).

These components can be used in the form of an individual substance or in a mixture.

Benzotriazole type UV absorbers are known in the prior art and are typically 2-(2'-hydroxyphenyl)benzotriazoles. The corresponding compounds include in particular 2-(2'-hydroxy-5'-methylphenyl)-benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chloro-benzotriazole, 2-(3'-tert-butyl-2'-hydroxy-5'-methylphenyl)-5-chloro-benzotriazole, 2-(3'-sec-butyl-5'-tert-butyl-2'-hydroxyphenyl)benzotriazole, 2-(2'-hydroxy-4'-octyloxyphenyl)benzotriazole, 2-(3', 5'-di-tert-amyl-2'-hydroxyphenyl)benzotriazole, 2-(3',5'-bis-(α,α-dimethylbenzyl)-2'-hydroxyphenyl)benzotriazole, 2-(3'-tert-butyl-2'-hydroxy-5'-(2-octyloxycarbonylethyl) phenyl)-5-chloro-benzotriazole, 2-(3'-tert-butyl-5'-[2-(2-ethylhexyloxy)-carbonylethyl]-2'-hydroxyphenyl)-5-chloro-benzotriazole, 2-(3'-tert-butyl-2'-hydroxy-5'-(2-methoxycarbonylethyl)phenyl)-5-chloro-benzotriazole, 2-(3'-tert-butyl-2'-hydroxy-5'-(2-metH-oxycarbonylethyl) phenyl)benzotriazole, 2-(3'-tert-butyl-2'-hydroxy-5'-(2-octyloxycarbonyl-ethyl)phenyl)benzotriazole, 2-(3'-tert-butyl-5'-[2-(2-ethylhexyloxy)carbonylethyl]-2'-hydroxy-phenyl) benzotriazole, 2-(3'-dodecyl-2'-hydroxy-5'-methylphenyl) benzotriazole, 2-(3'-tert-butyl-2'-hydroxy-5'-(2-isooctyloxy-carbonylethyl)phenylbenzotriazole, 2,2'-methylene-bis[4-(1,1,3,3-tetramethylbutyl)-6-benzotriazole-2-ylphenol]; the transesterification product of 2-[3'-tert-butyl-5'-(2-methoxy-carbonylethyl)-2'-hydroxyphenyl]-2H-benzotriazole with polyethylene glycol 300; [R—CH$_2$CH$_2$—COO—CH$_2$CH$_2$—, where R=3'-tert-butyl-4'-hydroxy-5'-2H-benzotriazol-2-ylphenyl, 2-[2'-hydroxy-3'-(α,α-dimethylbenzyl)-5'-(1,1,3,3-tetramethylbutyl)-phenyl]benzotriazole; 2-[2'-hydroxy-3'-(1,1,3,3-tetramethylbutyl)-5'-(α,α-dimethylbenzyl)-phenyl]benzotriazole. Further examples of UV absorbers of benzotriazole type that can be used are 2-(2-hydroxy-5-methylphenyl)benzotriazole, 2-[2-hydroxy-3,5-di(α,α-dimethylbenzyl)phenyl]benzotriazole, 2-(2-hydroxy-3,5-di-tert-butylphenyl)benzotriazole, 2-(2-hydroxy-3,5-butyl-5-methylphenyl)-5-chlorobenzotriazole, 2-(2-hydroxy-3,5-di-tert-butylphenyl)-5-chlorobenzotriazole, 2-(2-hydroxy-3,5-di-tert-amylphenyl)benzotriazole, 2-(2-hydroxy-5-tert-butylphenyl)benzotriazole, 2-(2-hydroxy-3-sec-butyl-5-tert-butylphenyl)benzotriazole and 2-(2-hydroxy-5-tert-octylphenyl)benzotriazole, phenol, 2,2'-methylenebis[6-(2H-benzotriazol-2-yl)-4-(1,1,3,3-tetramethylbutyl)]. These compounds are commercially available from BASF SE (Ludwigshafen, Germany) e.g. as Tinuvin® 360 and Tinuvin® 234.

Benzotriazole type UV absorber may also be used in combination with other UV absorbers, for instance with a bis-maloneat type UV absorber. An example of such combination is Eusorb® BLA 4200M (commercial product comprising Tinuvin® 329 and Hostavin® B-CAP), available from Eutec Chemical Co. Ltd.

The amounts the benzotriazole type UV absorber in the layer B of are from 0.1 to 5.0 wt.-%, preferably from 0.2 to 4.0 wt.-% and very particularly preferably from 0.5 to 3.0 wt.-%, based on the weight of the PMMA-based layer B. It is also possible to use mixtures of different benzotriazole type UV absorbers.

Triazine type UV absorber are typically 2-(2-hydroxphenyl)-1,3,5-triazines derivatives. Preferably used 2-(2-hydroxyphenyl)-1,3,5-triazines include inter alia 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, dihydroxyphenyl)-4,6-bis(2,4-dimethylphenyl)-1, 3,5-triazine, 2,4-bis(2-hydroxy-4-propyl-oxyphenyl) (2,4-dimethylphenyl)-1,3,5-triazine, 2-(2-hydroxy-4-octyloxphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropoxy)phenyl]-4,6-bis(2, 4-dimethyl)-1,3,5-triazine, 2-[2-hydroxy-4-(2-hydroxy-3-octyloxpropyloxy)phenyl]-4,6-bis(2,4-dimethyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy) phenyl]-4,6-bis(2,4-dimethylphenyl)-1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy) phenyl]-1,3,5-triazine, 2-(2-hydroxyphenyl)-4-(4-methoxyphenyl)-6-phenyl-1,3,5-triazine, 2-{2-hydroxy-4-[3-(2- ethylhexyl-1-oxy)-2-hydroxypropyloxy]phenyl}-4,6-bis(2,4-di-methylphenyl)-1,3,5-triazine, 2,4-bis(4-[2-ethylhexyloxy]-2-hydroxyphenyl)-6-(4-methoxyphenyl)-1,3,5-triazine. Triazine type UV absorbers such as 2-(4,6-diphenyl-1,3,5-triazin-2-yl)-5-hexyloxphenol, can also be used. These compounds are e.g. commercially available from BASF SE (Ludwigshafen, Germany) under trademarks Tinuvin® 1600, Tinuvin® 1577 or Tinuvin® 1545.

The amounts of the triazine type UV absorber are from 0.1 to 5.0 wt.-%, preferably from 0.2 to 3.0 wt.-% and very particularly preferably from 0.5 to 2.0 wt.-%, based on the weight of the layer. It is also possible to use mixtures of different triazine type UV absorbers.

Sterically hindered amines, HALS (Hindered Amine Light Stabilizer) UV stabilizers are per se known. They can be used to inhibit ageing phenomena in paints and plastics, especially in polyolefin plastics (Kunststoffe, 74 (1984) 10, pp. 620-623; Farbe+Lack, Volume 96, 9/1990, pp. 689-693). The tetramethylpiperidine group present in the HALS compounds is responsible for the stabilizing effect. This class of compound can have no substitution on the piperidine nitrogen or else substitution by alkyl or acyl groups on the piperidine nitrogen. The sterically hindered amines do not absorb in the UV region. They scavenge free radicals that have been formed, whereas the UV absorbers cannot do this. Examples of HALS compounds which have stabilizing effect and which can also be used in the form of mixtures are: bis(2,2,6,6-tetramethyl-4-piperidyl) sebacate, 8-acetyl-3-dodecyl-7,7,9,9-tetramethyl-1,3,8-triazaspiro(4,5)-decane-2,5-dione, bis(2,2,6,6-tetramethyl-4-piperidyl) succinate, poly(N-β-hydroxyethyl-2,2,6,6-tetramethyl-4-hydroxypiperidine succinate) or bis(N-methyl-2,2,6,6-tetramethyl piperidyl) sebacate.

The amounts used of the HALS compounds in each of the layers A, B and C are typically from 0.0 to 5.0 wt.-%, preferably from 0.1 to 3.0 wt.-% and very particularly preferably from 0.2 to 2.0 wt.-%, based on the weight of the layer B. It is also possible to use mixtures of different HALS compounds.

Other co-stabilizers that can be used are the HALS compounds described above, disulphites, such as sodium disulphite, and sterically hindered phenols and phosphites. Such co-stabilizers may be present in a concentration of 0.1 to 5.0 wt. %, based on the weight of the layer.

Sterically hindered phenols are particularly suitable for use in the foil of the present invention. Preferred sterically hindered phenols include inter alia 6-tert-butyl-3-methylphenyl derivatives, 2,6-di-tert-butyl-p-cresol, 2,6-tert-butyl-4-ethyl phenol, 2,2'-methylenebis-(4-ethyl-6-tert-butyl phenol), 4,4'-butylidenebis(6-tert-butyl-m-cresol), 4,4'-thiobis(6-tert-butyl-m-cresol), 4,4'-dihydroxy diphenyl cyclohexane, alkylated bisphenol, styrenated phenol, 2,6-di-tert-butyl-4-methyl phenol, n-octadecyl-3-(3',5'-di-tert-butyl-4'-hydroxy phenyl)propionate, 2,2'-methylenebis(4-methyl-6-tert-butyl phenol), 4,4'-thiobis(3-methyl-6-tert-butylphenyl), 4,4'-butylidenebis(3-methyl-6-tert-butylphenol), stearyl-β(3,5-di-4-butyl-4-hydroxy phenyl) propionate, 1,1,3-tris(2-methyl-4-hydroxy-5-tert-butylphenyl)butane, 1,3,5-trimethyl-2,4,6-tris(3-5-di-tert-butyl-4hydroxybenzyl)benzene, tetrakis-[methylene-3(3',5'-di-tert-butyl-4'-hydroxyphenyl)propionate]methane.
Commercially available sterically hindered phenols include SUMILIZER BHT BP-76, WXR, GA-80 and BP-101 (SUMITOMO), IRGANOX® 1076, IRGANOX® 565, IRGANOX® 1035, IRGANOX® 1425WL, IRGANOX® 3114, IRGANOX® 1330 and IRGANOX® 1010 (BASF SE), MARK AO-50, -80, -30, -20, -330 and -60 (ADEKA ARGUS), and TOMINOX SS, TT (YOSHITOMI), IONOX WSP (ICI), SANTONOX® (MONSANTO), ANTAGE CRYSTAL (KAWAGUCHI), NOCLIZER NS-6 (OUCHI SHINKO), TOPANOL® CA (ICI), CYANOX® 1790 (ACC).

Typically, the layers A, B or C may comprise:
from 0.5 to 4.0 wt.-% of a benzotriazole type compound as a first UV absorber;
from 0.5 to 3.0 wt.-% of a triazine type compound as a second UV absorber; and
from 0.2 to 2.0 wt.-% of a HALS type compound as a UV stabilizer, based on the total weight of the layer B.

In embodiments of the present invention, in which the multilayer foil comprises more than one layer comprising polymethyl(meth)acrylate, it showed to be advantageous in terms of enhanced weathering resistance and UV protection that the layer facing the environment comprises at least one triazine type UV absorber and the layer beneath that layer comprises at least one benzotriazole type UV absorber. Additionally, the inventors found that triazine type UV absorbers can be replaced by inorganic UV absorbers such as titanium dioxide, tin dioxide or glass in form of glass beads or glass powder without affecting the long-term stability of the resulting multilayer foil.

For instance, if it is intended to use the multilayer foil in such a way that the layer A faces the substrate thereby acting as adhesion-promoting layer, it is advantageous that the moulding composition of the layer A comprises, based on the weight of the moulding composition:
from 0.1 to 5.0 wt.-% of a benzotriazole type UV absorber;
from 0.0 to 5.0 wt.-% of one or several UV stabilizers; and
the moulding composition of the layer B comprises, based on the weight of the moulding composition:
from 0.1 to 5.0 wt.-% of a triazine type UV absorber;
from 0.0 to 5.0 wt.-% of one or several UV stabilizers.

In embodiments in which the layer A is coated with a layer D, it is advantageous that the moulding composition of the layer A comprises, based on the weight of the moulding composition:
from 0.1 to 5.0 wt.-% of a triazine type UV absorber;
from 0.0 to 5.0 wt.-% of one or several UV stabilizers; and
the moulding composition of the layer B comprises, based on the weight of the moulding composition:
from 0.1 to 5.0 wt.-% of a benzotriazole type UV absorber;
from 0.0 to 5.0 wt.-% of one or several UV stabilizers.

Adhesion-Promoting Copolymers

Typically, the adhesion-promoting copolymer comprises:
(i) from 70.0 to 99.5 wt.-% methyl methacrylate
(ii) from 0.5 to 15.0 wt.-% of an adhesion-promoting monomer; and
(iii) from 0.0 to 25.0 wt.-% of other vinyl-copolymerizable monomers having no functional groups other than the vinyl function, based on the weight of the adhesion-promoting copolymer.

The vinyl-copolymerizable monomers (iii) can be selected from a group of vinyl aromatic monomers such as α-halogen styrene, p-methylstyrene, p-tert-butylstyrene, vinylnaphthalene, as well as, preferably, α-methyl styrene and styrene, wherein styrene is particularly preferred.

The term "adhesion-promoting monomer" (ii) as used herein refers to a monomer having a polymerizable double bond as well as a reactive functional group capable of reacting with an amino group or a methylol group. Hence, the adhesion-promoting copolymer can chemically interact with the melamine resin of a HPL by performing heat reaction in a state of being contacted with a material containing methylol melamine and a derivative thereof, specifically, a melamine resin or a precursor thereof. The reaction temperature of the reactive functional group varies depending on the presence of a catalyst, a pH value, or the like, but is preferably 50 to 200° C. and more preferably 110 to 170° C. Since HPLs are produced generally at a temperature of 110 to 170° C., when the reaction temperature is 110 to 170° C., the adhesion-promoting copolymer chemically reacts with the melamine resin of HPLs.

Examples of reactive functional groups with respect to an amino group or methylol group include but are not limited to a hydroxyl group, a carboxyl group, an amino group, an amide group, an acid anhydride group, an imide group, and an epoxy group, wherein acid anhydride group and carboxyl group are particularly useful. Accordingly, adhesion-promoting monomers which are particularly suitable for use in the present invention include but are not limited to unsaturated carboxylic anhydrides, unsaturated dicarboxylic anhydrides and unsaturated dicarboxylic imides. Use of maleic acid anhydride, methacrylic acid anhydride, methacrylic acid, maleic acid anhydride or itaconic acid anhydride, N-phenylmaleimide, and N-cyclohexylmaleimide showed to lead to particularly advantageous adhesion-promoting properties. It is particularly advantageous to use those selected from the group consisting of GMA (glycidyl methacrylate), maleic acid derivatives, such as maleic acid, maleic acid anhydride (MA), methylmaleic anhydride, maleimide, methylmaleimide, maleamides (MAs), phenylmaleimide and cyclohexylmaleimide, fumaric acid derivatives, methacrylic anhydride, acrylic anhydride. Most promising results were observed with maleic acid anhydride and methacrylic acid anhydride.

In a preferred embodiment, the adhesion-promoting copolymer comprises:
  (i) from 50.0 to 95.0 wt.-%, preferably 60.0 to 90.0 wt.-%, more preferably from 70.0 to 85.0 wt.-%, even more preferably 70 to 80 wt.-% methyl methacrylate;
  (ii) from 0.2 to 25.0 wt.-%, preferably from 0.5 to 20.0 wt.-%, more preferably from 1.0 to 15.0 wt.-% and even more preferably 5.0 to 12.0 wt.-% maleic anhydride; and
  (iii) from 0.0 to 25.0 wt.-%, preferably from 2.0 to 15.0 wt.-% of other vinyl-copolymerizable monomers having no functional groups other than the vinyl function, based on the weight of the copolymer.

In a most preferred embodiment, the adhesion-promoting copolymer is a copolymer of MMA, styrene and maleic anhydride.

Coating Layer D

According to the present invention the foil further comprising a coating layer D adjacent to the layer A. Due to adhesive promoting effect of the silica particles in the layer A, the coating layer D can be advantageously uniformly applied as a liquid coating composition, preferably followed by a subsequent at least partial curing. Furthermore, the coating layer D shows an excellent adhesion on the layer A, characterised by a value of not higher than 3, preferably not higher than 2, more preferably not higher than 1 in a crosshatch test.

The coating layer D may comprise at least a partially cross-linked material selected from cross-linked polyurethanes, cross-linked polyurethane-(meth)acrylates, cross-linked poly(meth)acrylates or a mixture thereof.

Cross-Linked Polyurethanes

Use of cross-linked polyurethanes as scratch-resistant coatings is known in the prior art and described e.g. in US 2009/0085235. These materials are highly suitable for forming highly weathering resistant nano- or micro-structured surfaces. Furthermore, layer D based on cross-linked polyurethanes shows a good adhesion on the layer A as described above.

Cross-Linked Polyurethane-(Meth)Acrylates

In a further embodiment the coating layer D may comprise at least partially cross-linked polyurethane-(meth)acrylates. Cross-linked polyurethane-(meth)acrylates are known in the prior art and are described e.g. in WO 2017/109118 and WO 97/49746. The coating compositions forming the layer D comprise a resin component, a hardener component and, optionally, further additives such as radical initiators. The resin component and the hardener component are present in stoichiometric quantities.

These materials can be applied in form of a liquid coating composition onto the layer A and dried at a well-defined elevated temperature. Under these conditions, free hydroxyl groups in the resin component react with isocyanate groups of the hardener component to form a urethane-(meth)acrylate prepolymer coating. Importantly, reactivity of the (meth)acrylic double bonds of the resin component is retained at this stage. This provides a flexible non-sticky coated multi-layer foil that is easy to handle and can be stored in rolls at room temperature for a sufficient period of time. Importantly, no undesired blocking of rolls takes place and the coated multi-layer foil can be easily unwound for application onto a substrate.

In the second reaction step, typically during application of the coated foil onto a substrate, polymerization reaction of the (meth)acrylic double bonds in the resin component of the layer D takes place, which is triggered by elevated temperatures and pressures. This polymerization reaction is facilitated in the presence of radical initiators.

Hence, coatings comprising cross-linked polyurethane-(meth)acrylates typically cure in two separate steps. However, for some applications use cross-linked polyurethane-(meth)acrylates which can cure in three or even more separate steps may be more advantageous.

Typically, the resin component contains free, reactive (meth)acrylic double bonds and at least two reactive hydroxyl groups per molecule. Most preferably, the resin component has the following general Formula (I):

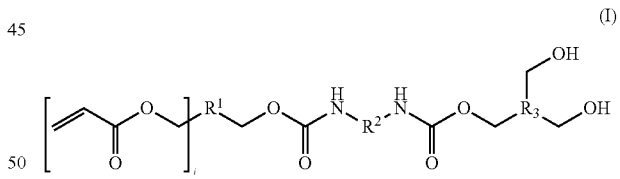

(I)

where $R^1$ is an alkylene or aliphatic polyether or polyester group, $R^2$ and $R^3$ are aliphatic or cycloaliphatic groups, and i=2-6, preferably 3-5.

The resin component of general Formula (I) is preferably formed from a polyfunctional (meth)acrylate monomer with at least one free hydroxyl group according to the general Formula (II)

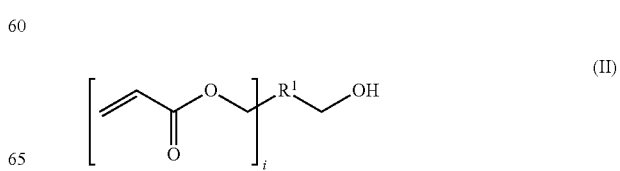

(II)

wherein i=2-6, preferably 3-5 and $R^1$ is an alkyl or aliphatic polyether or polyester group reacting with a diisocyanate in a double stoichiometric excess, based on the reactive hydroxyl groups in the (meth)acrylate monomer to form a urethane group. The free isocyanate group subsequently reacts with a triple, preferably polyfunctional alcohol to form a second urethane group, which contains both free, reactive (meth)acrylic double bonds and at least two reactive hydroxyl groups per molecule.

The hardener component is a trifunctional isocyanate of general Formula (III) which is usually blocked in its reactivity at room temperature:

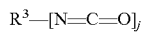 (III)

where j is at least 2, preferably 3, and $R^3$ is an aliphatic or cycloaliphatic residue.

The coating composition additionally comprises radical formers that are stable at room temperature as well as inhibitors to prevent a premature cross-linking reaction of the (meth)acrylic double bonds. Further optional additives in the composition are usually fillers, coloured pigments, flame retardants, UV absorbers, free radical scavengers.

In the first process step, the coating composition is applied onto the layer A of the multilayer foil and is partially cured, preferably at a temperature below 100° C. At this stage, free hydroxyl groups in the resin component react with the isocyanate groups of the hardener component upon formation of a urethane acrylate prepolymer coating containing reactive (meth)acrylic double bonds. A premature reaction of these (meth)acrylic double bonds can be additionally advantageously prevented by adding suitable inhibitors. Due to a careful control of the reaction temperature during this process step, the polyaddition reaction only occurs between the free hydroxyl groups of the resin component and the functional groups of the hardener component, whereas reactivity of the (meth)acrylic double bonds of the resin component remains unaffected. By this means, a flexible multilayer foil comprising a partially coated layer D is produced. This foil is easy to handle and can be stored for a sufficiently long period of time without undesirable curling.

In a separate process step, the multilayer foil comprising urethane acrylate prepolymer coating containing reactive (meth)acrylic double bonds in the layer D is laminated onto a substrate, which can be e.g. wood, plastic, or metal, and plastic or metal films. Preferably, the substrate is a high-pressure laminate (HPL). A press stack is normally made of several substrate materials impregnated with synthetic resin, which has as its outermost layer on at least one multilayer foil having partially cured layer D. This press stack is pressed at high pressure and temperatures above the drying temperature, preferably above 140° C., so that an additional cross-linking reaction of the reactive (meth)acrylic double bonds in the layer D occurs, with formation of a urethane acrylate polymer. Hence the cured layer D forms a scratch-resistant polyurethane-(meth)acrylate based coating.

In a further embodiment, the coating composition may comprise a mixture of components A to C and, optionally, D, in which
component A is a polymerizable (meth)acrylate compound having at least 2 groups with a (meth)acrylic double bond and no hydroxy groups per molecule,
component B is a polymerizable (meth)acrylate compound having one or more groups with a (meth)acrylic double bond as well as at least 2 hydroxy groups per molecule,
component C is a polyurethane prepolymer having at least 2 hydroxy groups and no isocyanate groups per molecule,
component D, if present, is a resin with an aminoplast structure having at least 2 hydroxy groups per molecule.

The component A typically comprises compounds selected from the Formulae (A1) and (A2), more preferred a mixture of the compounds of Formulae (A1) and (A2). It is especially preferred that component A consist of compounds of the Formulae (A1) and (A2):

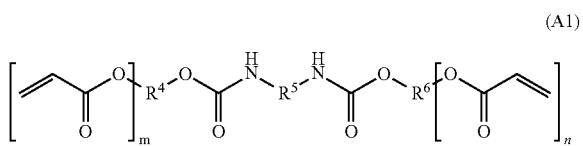 (A1)

wherein $R^4$ and $R^6$ are independently selected from an aliphatic hydrocarbon group, an aliphatic polyether group, and an aliphatic polyester group, $R^5$ is an aliphatic or cycloaliphatic hydrocarbon group, n=2-9, preferably 2-4, and m=2-9, preferably 2-4. m acrylic ester groups $H_2C=CH-C(O)-O-$ are each bound via an ester group to the group $R^4$, and n acrylic ester groups to the group $R^6$.

Preferably, $R^4$ and $R^6$ are independently selected from linear or branched, preferably branched, alkyl groups, especially preferred from alkyl groups with 3 to 10, more preferred 3 to 6, C-atoms. $R^5$ is preferably an alkyl group which can be open-chained (i.e. linear or branched) or cyclic or in which open chain or branched units can be combined, especially preferred an alkyl group with 3 to 20, more preferred 6 to 12, C-atoms. $R^4$ in its preferred form as alkyl group in the Formula (A1) for example provides m+1 valencies for bonding to neighbouring groups. This applies analogously to other components of the coating system as well.

 (A2)

wherein $R^7$ is an aliphatic hydrocarbon group, and o=2-6, preferably 3-5. Preferably, $R^7$ is a linear or branched, preferably branched, alkyl group, especially preferred an alkyl group with 3 to 10, more preferred 3 to 6, C-atoms.

Component B preferably comprises compounds of the Formula (B1) and especially preferred it consists of compounds of the Formula (B1):

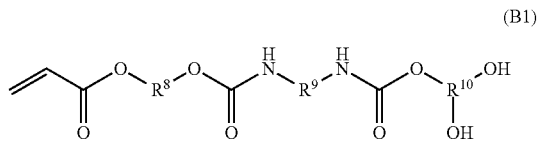 (B1)

wherein $R^8$ is selected from an aliphatic hydrocarbon group, an aliphatic polyether group or an aliphatic polyester group, $R^9$ and $R^{10}$ are independently an aliphatic or cycloaliphatic hydrocarbon group, and p=2-9, preferably 2-4. p acrylic ester groups H$_2$C=CH—C(O)—O— are each bound via an ester group to the group R$^8$, and 2 hydroxy groups are bound to the group R$^{10}$.

R$^8$ is preferably a linear or branched, preferably branched, alkyl group, especially preferred an alkyl group with 3 to 10, more preferred 3 to 6, C-atoms. R$^9$ is preferably an alkyl group which can be open-chained (i.e. linear or branched) or cyclic or in which open chain or branched units can be combined, especially preferred an alkyl group with 3 to 20, more preferred 6 to 12, C-atoms. R$^{10}$ is preferably an alkyl group which can be open-chained (i.e. linear or branched) or cyclic or in which open chain or branched units can be combined, especially preferred a linear or branched alkyl group with 3 to 20, more preferred 3 to 10 C-atoms.

Component C is a polyurethane prepolymer having at least 2 hydroxy groups and no isocyanate groups per molecule, wherein the hydroxy groups are generally alcoholic hydroxy groups. The polyurethane prepolymer can be linear or branched. It is preferably formed from a polyisocyanate with 2 to 4, preferably 2, isocyanate groups and a polyalcohol with 2 to 4, preferably 2 or 3, alcoholic hydroxy groups. The polyisocyanate and polyalcohol are preferably aliphatic compounds. The number of subunits in the polyurethane prepolymer which are formed from the polyisocyanate, and the number of subunits which are formed from the polyalcohol, is preferably 2 to 20 each, more preferred 2 to 9. The number of hydroxy groups per molecule of the polyurethane prepolymer is preferably 2 to 9, more preferred 2 to 5.

Preferred as component C are those polyurethane prepolymers which do not comprise any other reactive groups in addition to the at least 2 hydroxy groups. The term "reactive group" refers to possible reactions between components of the coating system; i.e. in these especially preferred polyurethane prepolymers of component C, the at least 2 hydroxy groups are the only groups capable of reacting with other components of the coating system to form a covalent bond.

Component C preferably comprises polyurethane prepolymers selected from the Formulae (C1) and (C2), i.e. component C comprises a compound of the Formula (C1) and/or a compound of the Formula (C2). It is especially preferred that component C consist of polyurethane prepolymers selected from the compounds of Formulae (C1) and (C2). Combinations of compounds of (C1) and (C2) are also preferred.

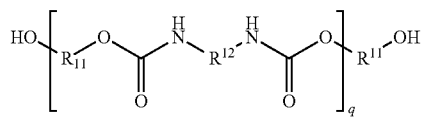

(C1)

wherein R$^{11}$, independently at every occurrence, is selected from an aliphatic hydrocarbon group which can be substituted with one or more hydroxyl groups, an aliphatic polyether group, and an aliphatic polyester group, R$^{12}$, independently at every occurrence, is selected from an aliphatic or cycloaliphatic hydrocarbon group, and q is 2-9.

It is preferred that all groups R$^{11}$ be the same and that all groups R$^{12}$ be the same.

Preferably, R$^{11}$ is a linear or branched, preferably branched, alkyl group, especially preferred an alkyl group with 3 to 10, more preferred 3 to 6, C-atoms. The alkyl group R$^{11}$ can also be substituted with one or more hydroxy groups. Preferably, 0, 1, or 2 such hydroxy substituents are present. R$^{12}$ is preferably an alkyl group which can be open-chained (i.e. linear or branched) or cyclic or in which open chain or branched units can be combined, especially preferred an alkyl group with 3 to 20, more preferred 6 to 12, C-atoms.

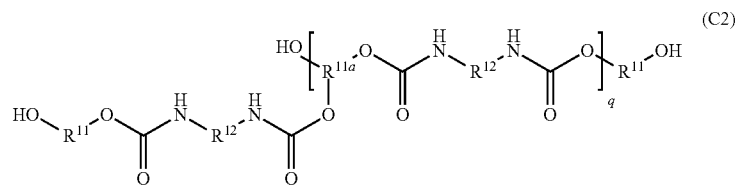

(C2)

wherein R$^{11}$ and R$^{11a}$, independently at every occurrence, are selected from an aliphatic hydrocarbon group, which can be substituted with one or more OH groups, an aliphatic polyether group, and an aliphatic polyester group, R$^{12}$, independently at every occurrence, is an aliphatic or cycloaliphatic hydrocarbon group, and q is 2-9.

For Formula (C2), it is preferred that all groups R$^{11}$ and R$^{11a}$ are the same and all groups R$^{12}$ are the same. Preferably, R$^{11}$ and R$^{11a}$ are each a linear or branched, preferably branched, alkyl group, especially preferred an alkyl group with 3 to 10, more preferred 3 to 6, C-atoms. The alkyl groups R$^{11}$ and R$^{11a}$ can also be substituted with one or more hydroxy groups. Preferably, R$^{11}$ has 1 or 2 hydroxy substituents, and R$^{11a}$ has 0 or 1 hydroxy substituent. R$^{12}$ is preferably an alkyl group which can be open-chained (i.e. linear or branched) or cyclic or in which open chain or branched units can be combined, especially preferred an alkyl group with 3 to 20, more preferred 6 to 12, C-atoms.

The optional component D is a resin with an aminoplast structure having at least 2 hydroxy groups per molecule, wherein the hydroxy groups are generally alcoholic hydroxy groups. The basic structure of the resin of component D can also carry groups formed by the reaction of hydroxy groups, e.g. ester groups or urethane groups. Preferably 2 to 30, more preferred 10 to 30, hydroxy groups are present per molecule. The resin with an aminoplast structure is preferably a cured resin in the form of a powder. The average molecular weight (Mn) of the resin of the optional component D is preferably between 1,000 g/mol and 1,000,000 g/mol. The resin with an aminoplast structure is preferably a resin with a urea-formaldehyde resin structure which can be obtained by polymerization (in particular, polycondensation) of formaldehyde and urea, more preferred a cured resin in the form of a powder with a urea-formaldehyde resin structure.

The coating composition for forming the layer D is present as a mixture of components A, B, C and, optionally, D, optionally in a solvent. Examples of solvents include esters such as ethyl acetate, butyl acetate, 2-butoxyethyl acetate, aliphatic, cycloaliphatic and aromatic hydrocarbons, alcohols, glycols, glycol ethers or ketones. The concentration of components A to C and, if present, D in the solvent can, for example, be 65 wt.-% to 95 wt.-%, based on the total weight of the solution.

For the preparation of the resin component of the coating composition, components A to C and, if present, D can be provided and mixed. Alternatively, especially for the provision of components A (such as e.g. the compound of Formula (A1)), B, and C, starting products such as polyols, polyisocyanates, and/or mixed-functional compounds such as a polyacrylate, can be mixed with one or more hydroxyl groups from which components A, B, and C are prepared during a synthesis of the resin component. For instance, the resin component can be prepared by way of a single- or multi-step synthesis at temperatures of 30 to 130° C. Preferably, during the synthesis of the resin component, the resin with an aminoplast structure as component D is present in the synthetic mixture from the onset of the synthesis.

During the preparation of the resin component, the mixture is preferably thermally heated to a temperature of 30 to 130° C. after the addition of the resin with an aminoplast structure D.

In the resin component, component A is preferably present in an amount of 40.0 to 80.0 wt.-%, component B is present in an amount of 19.0 to 55.0 wt.-%, component C is present in an amount of 0.5 to 5.0 wt.-%, and the optional component D is present in an amount of 0.5 to 7.0 wt.-%, based on the total weight of components A to C, optionally A to D as 100 wt.-%. In a more preferred embodiment, the resin component comprises the component of Formula (A1) in an amount of 15.0 to 45.0 wt.-%, the component of Formula (A2) in an amount of 15.0 to 45.0 wt.-% (wherein the total amount of (A1) and (A2) is 40.0 to 80.0 wt.-%), the component of Formula (B1) in an amount of 19.0 to 55.0 wt.-%, the components (C1) and (C2) in a total amount of 0.5 to 5.0 wt.-%, and the optional component D in an amount of 0.5 to 7.0 wt.-%. Again, the sum of the components is 100 wt.-%.

In an even more preferred embodiment, the resin component comprises the component of Formula (A1) in an amount of 20.0 to 40.0 wt.-%, the component of Formula (A2) in an amount of 20.0 to 40.0 wt.-% (wherein the total amount of (A1) and (A2) is 40.0 to 80.0 wt.-%), the component of Formula (B1) in an amount of 25.0 to 47.0 wt.-%, the components (C1) and (C2) in a total amount of 0.6 to 3.0 wt.-%, and component D in an amount of 1.0 to 5.0 wt.-%. Again, the sum of the components is 100 wt.-%.

In an especially preferred embodiment, the resin component comprises the component of Formula (A1) in an amount of 25.0 to 35.0 wt.-%, the component of Formula (A2) in an amount of 25.0 to 35.0 wt.-% (wherein the total amount of (A1) and (A2) is 50.0 to 70.0 wt.-%), the component of Formula (B1) in an amount of 30.0 to 42.0 wt.-%, the components (C1) and (C2) in a total amount of 0.8 to 2.0 wt.-% and component D in an amount of 2.0 to 4.5 wt.-%. Again, the sum of the components is 100 wt.-%.

Cross-Linked Poly(Meth)Acrylates

Cross-linked poly(meth)acrylates are also suitable for forming the layer D. The corresponding coating compositions are known in the prior art and are described inter alia in WO 2008/155149. Said coating compositions normally comprise at least 40% by weight of (meth)acrylates having at least two double bonds and two different polymerization initiators, preferably at least one photoinitiator and at least one thermal initiator. Use of two different thermal initiators acting at different temperatures is also possible. (Meth) acrylates can be preferably selected from 1,6-hexanediol diacrylate, trimethylolpropane triacrylate and pentaerythrityl tetraacrylate or mixtures thereof.

The coating compositions may further comprise lubricants, colorants, metallic pigments, UV stabilizers, fillers or nanomaterials.

Similarly to compositions comprising polyurethane-(meth)acrylates, coatings based on cross-linked poly(meth) acrylates can also be cured in several distinct process steps. Thus, after application of the coating onto the layer A preliminary curing takes place. The resulting material is relatively flexible, which is advantageous in terms of handling of the multilayer foil. After the coated multi-layer foil has been applied onto the substrate, final curing of the coating takes place in the second process step. The resulting layer D becomes highly scratch-resistant due to a high cross-linking grade.

Further Additives

The moulding composition forming any of the layers of the present invention may further optionally comprise further additives selected from colourants, dispersants, flow improvers, lubricants, fillers, heat stabilizers, etc provided that properties of the composition are not adversely affected by these additives. These compounds are well-known to a skilled person and therefore do not need to be described here in detail.

Properties of the Foil

Depending on the envisaged purpose, the foil of the present invention may have a total thickness between 1.0 µm and 300.0 µm, more preferably between 1.0 µm and 200.0 µm, yet even more preferably between 5.0 µm and 100.0 µm.

The thickness of the foil of the present invention and of its layers can be determined by mechanical scanning according to the norm ISO 4593-1993. Additionally, the thickness of the foil of the present invention and of its individual layers can be determined using a scanning electron microscope. For this purpose, the foil samples can be frozen in liquid nitrogen, mechanically broken and the freshly obtained surfaces are analysed.

If the layers B and, optionally C are present, the layer A typically has a thickness from 1.0 µm to 30.0 µm, preferably from 5.0 µm to 20.0 µm. In the absence of the layers B and C the layer A typically has a thickness from 20.0 µm to 200.0 µm, preferably from 30.0 µm to 150.0 µm.

The layer B usually has a thickness between 10.0 µm and 200.0 µm, preferably between 15.0 µm and 150.0 µm.

The adhesion-promoting layer C, if present, usually has a thickness from 1.0 µm to 30.0 µm, preferably from 2.0 µm to 20.0 µm.

Due to presence of protruding silica particles in the layer A, the outer surface of the layer A before coating with the layer D typically has a roughness value Rz to DIN 4768 of at least 0.7 µm, preferably from 1.0 to 50.0 µm, more preferably from 2.0 to 40.0 µm, even more preferably from 5.0 to 30.0 µm. The roughness measurements can be carried out using a commercially available instrument such as Form Talysurf 50 produced by Rank Taylor Hobson GmbH.

The gloss (R 60°) of the outer surface of the layer A before coating with the layer D to DIN 67530 (January 1982) is usually at most 40, preferably at most 30, in particular from 15 to 30. The gloss measurements can be carried out using an RL laboratory reflectometer such as a reflectometer of Fa. Dr. Hach-Lange.

Process for the Manufacturing of the Foil

Depending on the intended application, the foil of the present invention can be produced at any desired thickness. A surprising factor here is an exceptional weathering resistance and mechanical stability and a very high weathering and mechanical protection provided to the substrate. For the purposes of the invention preference is given to a relatively thin plastics moulding, namely a film or a foil, characterized by a thickness in the range from 10.0 to 200.0 µm, preferably in the range from 40.0 to 120.0 µm, particularly preferably in the range from 50.0 to 90.0 µm.

The process for the manufacturing of the foil typically comprising the following steps i) to ii):
  i) a foil comprising the layer A is prepared by extrusion or, if the layers B and, optionally, C are present, a foil comprising the layers A, B and, optionally, C is prepared by co-extrusion;
  ii) a coated foil is prepared by coating the layer A of the foil obtained in the step i) with a layer D;
wherein the coating layer D comprises a material which undergoes a partial cross-linking in the step ii).

The mixtures of individual components of the layer A, and, if present, B and C can be prepared via dry blending of the components, which are in pulverulent, granular, or preferably pelletized, form. Such mixtures may also be processed via melting and mixing of the individual components in the molten state or via melting of dry premixes of the individual components to give a ready-to-use moulding composition. By way of example, this may take place in single- or twin-screw extruders. The resultant extrudate may then be pelletized. Conventional additives, auxiliaries and/or fillers may be admixed directly or added subsequently by the final user as required.

The foil of the present invention can then be produced by methods known per se, examples being co-extrusion or lamination or by extrusion lamination, followed by coating with the layer D.

One particular production variant relates to a process comprising a step in which the foil of the present invention is moulded in a foil-moulding process, preferably in chill-roll process, followed by coating with the layer D.

Application of the Multilayer Foil onto a Substrate

The inventive foils have a broad range of applications. One preferred use of the foils is coating of plastics mouldings or metallic items. In particular, the substrate protected by the foil may be a melamine-resin-impregnated paper, a polymeric material which is optionally fibre-reinforced, preferably polyvinyl chloride (PVC), polycarbonate (PC) or polypropylene (PP) or a metal, preferably steel or aluminium, and the co-extruded foil is directly applied to the substrate.

Here, it is particularly advantageous to coat plastics mouldings which comprise PVC or are composed of PVC. The protected substrate is advantageously by way of example a window profile composed of aluminium, of wood, of plastic or of a composite material, may bear a decorative foil, preferably composed of PC, SAN or PVC. This article is then protected from weathering by using the inventive foil. Another preferred use of the inventive foil is design of a high-specification, durable surface finish for substrate materials. Furthermore, the foils can be advantageously used in traffic control materials (TCM).

As described above, the foil of the present invention can be applied onto a substrate in such a way that the layer A is directly in contact with the surface of the substrate and thereby acts an adhesion-promoting layer. In this embodiment, if the foil of the present invention substantially consists of layers A and D, the layer D is facing the environment and the layer A is located between the layer D and the substrate. Hence, the layers are arranged in the following order:

layer D, if present,
  layer A
  substrate

Furthermore, if the foil of the present invention additionally comprises the layers B and C, the layers are in the following order:
  layer D
  layer A
  layer B
  layer C
  substrate.

A further aspect of the present invention is a process for the manufacturing of a coated article, comprising a step of applying a foil onto the surface of said substrate. This coated article comprises a substrate and has an outer surface, wherein the substrate is at least partially covered by a foil, wherein said foil has layers arranged in the following order, beginning from the outer surface of the coated article:
  layer D
  layer A
  layer B, if present,
  layer C, if present,
  substrate.

Application of the inventive foil onto a substrate can be carried out by a method know in the prior art. The process typically comprises the following steps i) to iii):
  i) a foil comprising the layer A is prepared by extrusion or, if the layers B and, optionally, C are present, a foil comprising the layers A, B and, optionally, C is prepared by co-extrusion;
  ii) a coated foil is prepared by coating the layer A of the foil obtained in the step i) with a layer D;
  iii) the coated foil obtained in the step ii) is applied onto a substrate by means of lamination or extrusion lamination, wherein the multi-layer article is obtained; and wherein the coating layer D comprises a material which undergoes a partial cross-linking in the step ii) and a further cross-linking in the step iii).

The foil is preferably applied by means of co-extrusion to the substrate to be protected. Application of the foil by means of foil lamination to the material to be protected is also possible. Preference is also given to a use which is characterized in that the foil is applied by means of extrusion lamination to the material to be protected. Preferably, extrusion lamination is carried out at a temperature greater than or equal to 120° C. and upon application of a mechanical pressure greater than or equal to 1 MPa, preferably greater than or equal to 2 MPa, more preferably greater than or equal to 4 MPa, more preferably greater than or equal to 6 MPa, more preferably greater than or equal to 7 MPa.

In one embodiment of the present invention, the article itself may be a foil or a sheet, which can be conveniently stored and/or handled in form of a roll.

In preferred embodiments the coated article of the present invention may be a high-pressure laminate (HPL), a medium pressure laminate (MPL) or a continuous pressure laminate (CPL). Hence, one aspect of the present invention relates to a process for the manufacturing of a high-pressure laminate using the foil as described above. In a particularly preferred embodiment, multi-layer materials obtainable using the foil of the invention are decorative high-pressure laminates (HPLs) according to norms EN 438-2 and EN 438-6, which are composed of layers of webs of fibrous material (e.g. paper), impregnated with curable resins, these being bonded to one another by means of the high-pressure process described below. The surface layer of the material, one or both sides of which have decorative colours or patterns, is impregnated with resins based on amino plastics, e.g. melamine resins. The amino or methylolamino groups present in the decorative layer during the high-pressure process then serve as reaction partners for covalent bonding to the polymethacrylate layer (in this case foils) for surface finishing. The corresponding high-pressure laminates are described inter alia in US 2017/019 7391 A1.

Preparation of HPL is typically carried out batchwise, at a pressure of from 1 MPa to 20 MPa, preferably of from 4 MPa to 15 MPa, more preferably from 6 MPa to 10 MPa and a temperature of from 120° C. to 220° C. Under these conditions the coating layer D, if present, typically undergoes a final cross-linking, thereby forming a highly scratch-resistant coating.

The high-pressure process produces a long-lasting bond between the decorative layer and the polymethacrylate layer applied according to the invention. The temperature set during the process and the associated interpenetration of the melamine-resin-saturated decorative paper into the foil ensures sufficient formation of covalent bonds and therefore long-lasting bonding to the material.

The high-pressure process is defined as simultaneous use of heat (temperature greater than or equal to 120° C.) and high pressure (greater than or equal to 3 MPa), the result being that the curable resins flow and then harden to produce a homogeneous non-porous material of relatively high density (at least 1.35 g/cm$^3$) having the required surface structure. The high-pressure process can be carried out batchwise or as a roll-to-roll process i.e. continuously. The product of the later one is usually called continuous pressure laminate (CPL).

The method for the manufacturing of CPLs comprises providing curable resin-based support, e.g. a phenolic resin-based support structure or a melamine resin-based support structure. The support structure can comprise several individual layers which are typically paper layers. The paper layers can be available as cardboard layers. One or all of these layers preferably comprise the phenolic resin or the melamine resin. The support structure usually has a thickness from 0.1 mm to 2 mm, further preferably from 0.2 mm to 1.5 mm, further preferably from 0.3 mm to 1.2 mm, further preferably from 0.4 mm to 1.0 mm, and further preferably from 0.5 mm to 0.8 mm. The CPL process involves pressing the multilayer foil of the present invention with the support structure. The time with which the material is subjected to pressure and temperature is normally significantly shorter than with the HPL batch process. In a CPL process the layers can be pressed in a continuous process into a kind of endless plate, by using e.g. a double-sided heated double-belt press. The double-belt press can comprise structural belts (i.e. belts with structured/embossed surface). The pressing pressure can be lower than in the production of HPLs. Preferably, pressing is carried out in the CPL process at a pressure of 1.0 MPa to 10 MPa, further preferably from 1.5 MPa to 8.0 MPa, further preferably from 2.0 MPa to 6.0 MPa, further preferably from 2.5 MPa to 4.5 MPa and most preferably from 3.0 MPa to 3.5 MPa. The temperature during this step is usually kept between 120° C. and 200° C., further preferably between 140° C. and 180° C., further preferably between 150° C. to 170° C. Under these conditions the coating layer D typically undergoes a final cross-linking, thereby forming a highly scratch-resistant coating.

The following embodiments of multilayer articles of the present invention showed particularly advantageous properties:

Multilayer Article Embodiment 1

Figure 5:
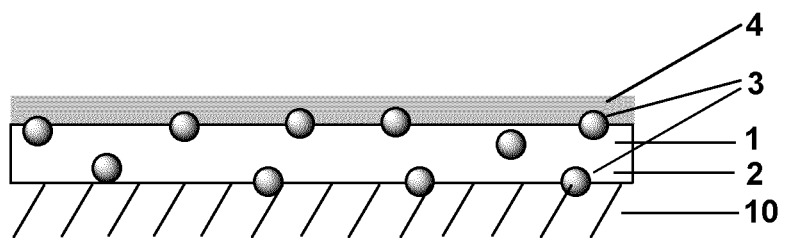
FIG. 5: substrate coated with the foil of the present invention comprising the layer A, coated with a layer D

The multilayer article is schematically illustrated by FIG. 5.

The foil is one of the Foil Embodiment 1 (cf. FIG. 1).
The substrate is HPL.

Multilayer Article Embodiment 2

Figure 6:
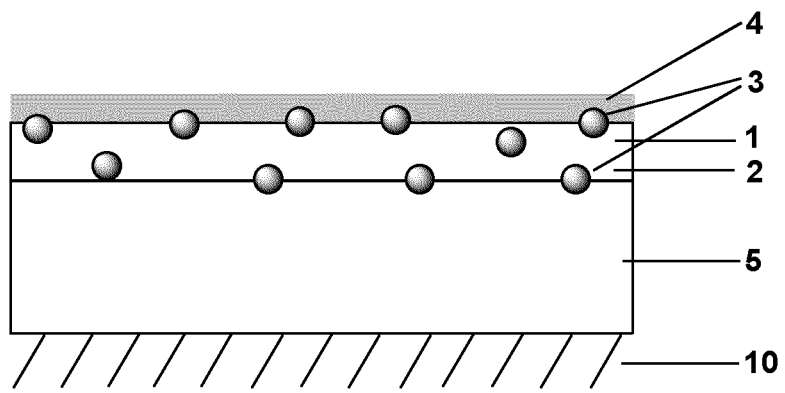
FIG. 6: substrate coated with the foil of the present invention comprising layers A and B, wherein the layer A is coated with the layer D

The multilayer article is schematically illustrated by FIG. 6.

The foil is one of the Foil Embodiment 2 (cf. FIG. 2).
The substrate is HPL.

Multilayer Article Embodiment 3

The multilayer article is schematically illustrated by FIG. 6.

The foil is one of the Foil Embodiment 3 (cf. FIG. 3).
The substrate is PVC.

Multilayer Article Embodiment 4

Figure 7:
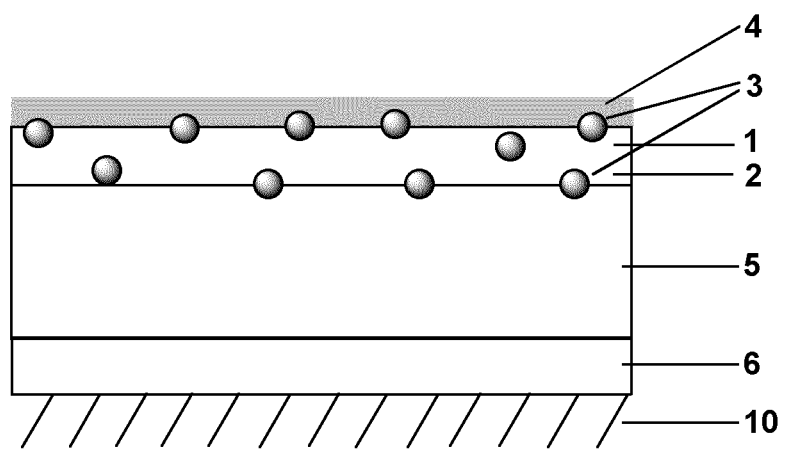
FIG. 7: substrate coated with the foil of the present invention comprising layers A, B and C, wherein the layer A is coated with the layer D

The multilayer article is schematically illustrated by FIG. 7.

The foil is one of the Foil Embodiment 4 (cf. FIG. 3).
The substrate is PVC.

Multilayer Article Embodiment 5

Figure 8:
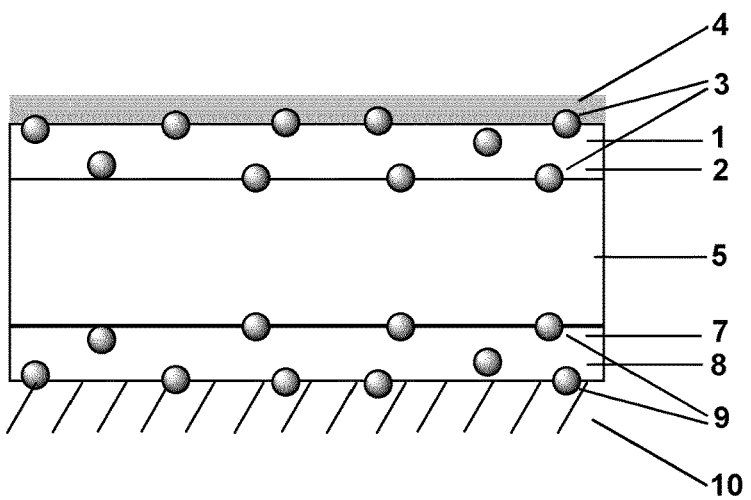
FIG. 8: substrate coated with the foil of the present invention comprising layers A, B and C, wherein the layer A is coated with the layer D, and the layer C comprises particulate silica

The multilayer article is schematically illustrated by FIG. 8.

Figure 4:
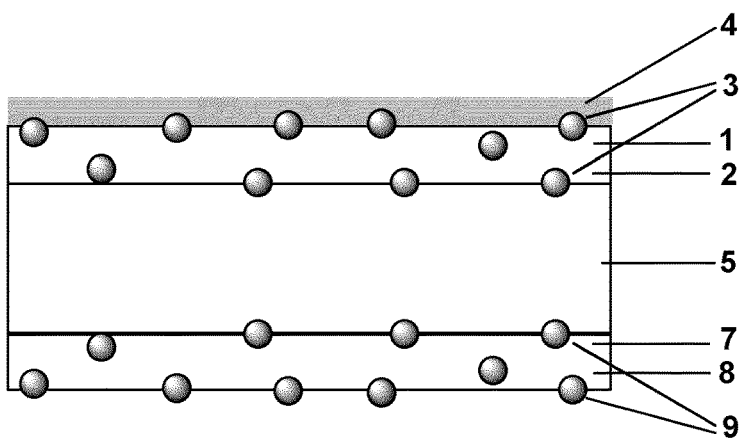
FIG. 4: foil of the present invention comprising the layer A coated with the layer D one side as well as layers B and C, wherein the layer C comprises particulate silica

The foil is one of the Foil Embodiment 5 (cf. FIG. 4).
The substrate is HPL.

Multilayer Article Embodiment 6

Figure 9:
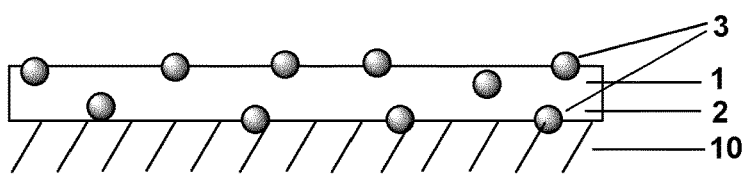
FIG. 9: substrate coated with the foil of the present invention comprising the layer A

The multilayer article is schematically illustrated by FIG. 9.

Composition of the layer A of the foil corresponds to that of the Foil Embodiment 1.
The substrate is HPL.

Multilayer Article Embodiment 7

Figure 10:
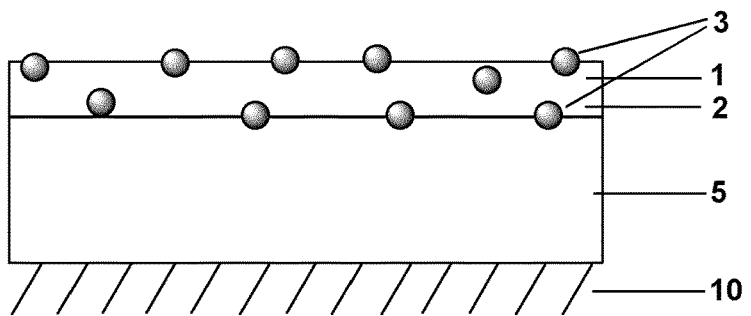
FIG. 10: substrate coated with the foil of the present invention comprising the layers A and B

The multilayer article is schematically illustrated by FIG. 10.

Composition of the layers A and B of the foil corresponds to that of the Foil Embodiment 2.
The substrate is HPL.

Multilayer Article Embodiment 8

Figure 11:
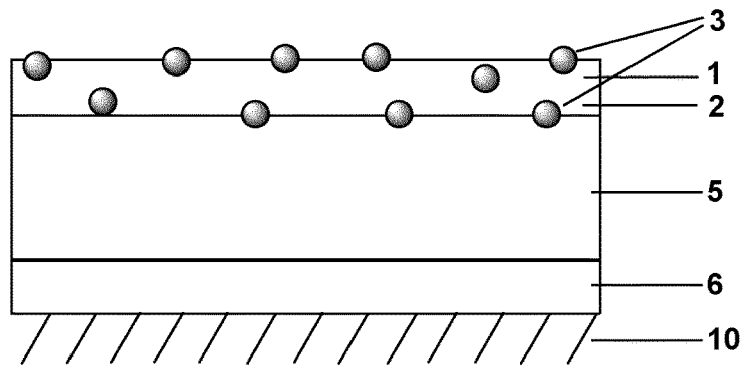
FIG. 11: substrate coated with the foil of the present invention comprising layers A, B and C

The multilayer article is schematically illustrated by FIG. 11.

Composition of the layers A, B and C of the foil corresponds to that of the Foil Embodiment 3.
The substrate is PVC.

Multilayer Article Embodiment 9

The multilayer article is schematically illustrated by FIG. 11.

Composition of the layers A, B and C of the foil corresponds to that of the Foil Embodiment 4.

The substrate is PVC.

Multilayer Article Embodiment 10

Figure 12:
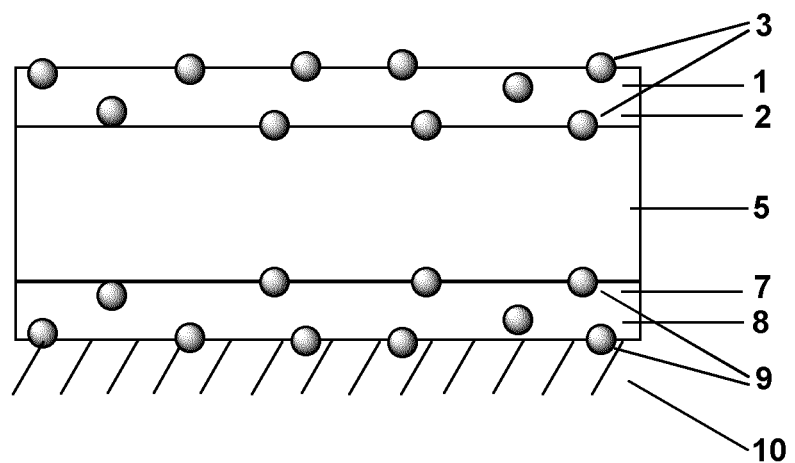
FIG. 12: substrate coated with the foil of the present invention comprising layers A, B and C, wherein the layer C comprises particulate silica
  1. layer A
  2. matrix of impact modified polyalkyl (meth)acrylate
  3. silica particles
  4. coating layer D
  5. layer B
  6. layer C
  7. matrix of impact modified polyalkyl (meth)acrylate
  8. adhesion-promoting layer C, comprising silica particles
  9. silica particles
  10. substrate
Figure 13:
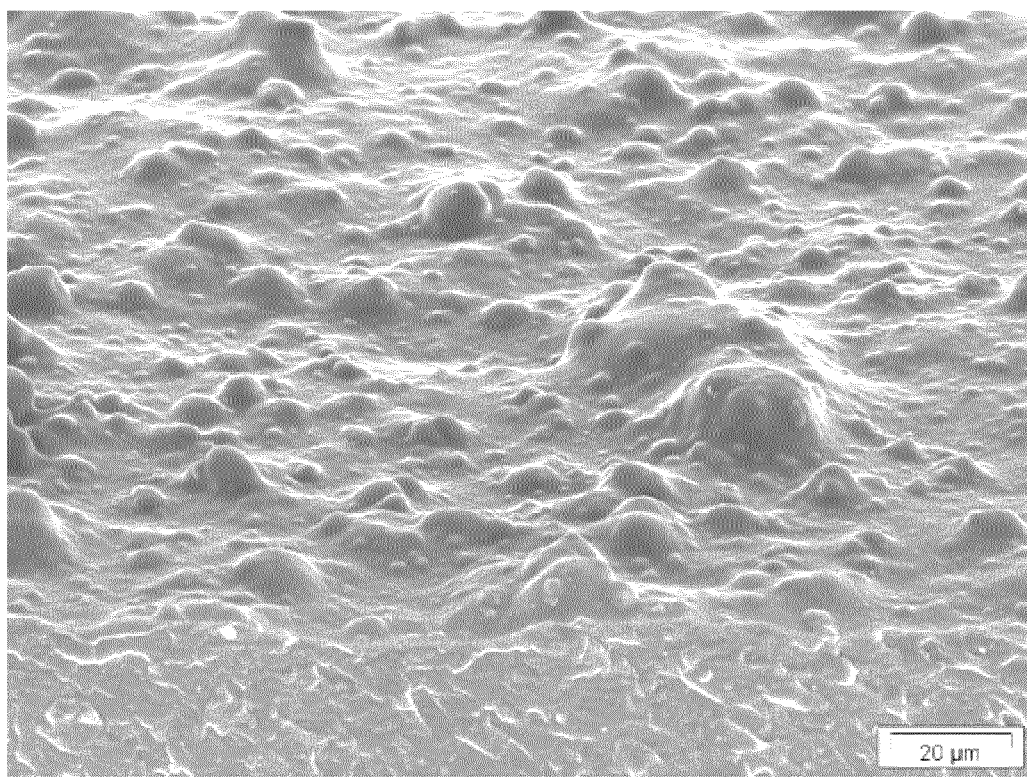
FIG. 13: microphotograph of the surface of the layer A according to the present invention. The image was obtained with a scanning electron microscope JEOL JSM IT 3000. Magnification: 750×, 10 kV, SED detector. The foil sample was frozen in liquid nitrogen, mechanically broken and the freshly obtained surface was analysed.

The multilayer article is schematically illustrated by FIG. 12.

Composition of the layers A, B and C of the foil corresponds to that of the Foil Embodiment 5.

The substrate is HPL.

SEM Images

SEM images were obtained using a scanning electron microscope JEOL JSM IT300, commercially obtainable from JEOL Ltd. The foil samples were frozen in liquid nitrogen, mechanically broken and the freshly obtained surfaces were analysed.

The measurement parameters were as follows:
Variable flow of electrons from a tungsten filament (cathode)
Vacuum system: Rotary pump/oil diffusion pump
X-Y-Z-rotation-tilt: totally motorized
Working distance (WD): 5 to 70 mm (common: 10 mm)
Sample rotation: 360°
Sample tilting: −5 to max. 90° (depending on WD)
Magnification: 750×
Maximum resolution: ~3 nm
Detectors: Secondary Electrons Detection (SED)
  Back Scattered Electrons (BSE, 5 segments)
  Energy dispersive X-Ray Analysis (EDS)

Sample Preparation

For the measurement of foil thickness, the samples were frozen using liquid nitrogen and mechanically broken. For this purpose, a brittle fracture was performed. The obtained fracture surface was analysed.

Electrically Conductive Layer

All standard preparations were sputtered with gold to obtain an electrically conductive surface.

Measurements in the Image

The average thickness of the foil and the average thickness of individual layers were measured in the SEM image. To enable subsequent measurements of existing images all images as well as the relevant measurement parameters were stored in a SEM image database.

The following examples will illustrate the present invention in a greater detail without being limiting.

EXAMPLES

The foils comprising layers A and, optionally, B and C were produced by adapter co-extrusion using chill-roll process at 240-250° C. (melt temperature in the extrusion die) at extrusion speed 7.3 m/min using a 35 mm-diameter single screw extruder and a 25 mm-diameter single screw co-extruder. In case of a 3-layer foil a second 25 mm-diameter single screw co-extruder was used. Alternatively, production can be achieved by way of a multiple-manifold co-extrusion process or a combination of adapter and multiple-manifold co-extrusion. Subsequently, the layer D was applied onto the layer A by coating.

The adhesion promoter used was a copolymer of 75 wt.-% of MMA, 15 wt.-% of styrene and 10 wt.-% of maleic anhydride. The weight-average molar mass Mw of this copolymer was about 100 000 g/mol (determined by means of GPC against a PMMA standard).

As particulate silica precipitated hydrophilic silica with a specific surface area of about 700 $m^2/g$ (measured by a BET method, based on ISO 9277), available from Evonik Industries AG, Hanau was used.

PMMA 1 mentioned in examples below is a copolymer of 96 wt.-% methyl methacrylate and 4 wt.-% methyl acrylate with mass average molecular weight Mw of 155000 g/mol (determined by means of GPC against a PMMA standard), available from Rohm GmbH, Darmstadt.

PMMA 2 mentioned in examples below is a copolymer of 99 wt.-% methyl methacrylate and 1 wt.-% methyl acrylate with mass average molecular weight Mw of 110000 g/mol (determined by means of GPC against a PMMA standard), available from Rohm GmbH, Darmstadt.

PMMA 3 mentioned in examples below is a copolymer of 96 wt.-% methyl methacrylate and 4 wt.-% methyl acrylate with mass average molecular weight Mw of 115000 g/mol (determined by means of GPC against a PMMA standard), available from Rohm GmbH, Darmstadt.

Impact modifiers 1, 3 and 4 mentioned in examples below are butyl acrylate-based acrylic core-shell impact modifiers.

Impact modifier 2 mentioned in examples below is a butyl acrylate-based acrylic core-shell-shell impact modifier.

Tinuvin® 360 (benzotriazole type UV absorber) and Tinuvin® 1600 (triazine type UV absorber) are commercially available from BASF SE, Ludwigshafen.

Chimassorb® 119 is a hindered amine light stabilizer (HALS), commercially available from BASF SE, Ludwigshafen.

Production Example 1 (Inventive)

The moulding compound forming the layer A was prepared using a twin-screw extruder. A triple layer foil having a total thickness of 75 μm was prepared by extrusion at 240-250° C. (melt temperature) at extrusion speed 7.3 m/min using a 35 mm-diameter single screw extruder and a 25 mm-diameter single screw co-extruder.

The foil had the following composition:

The layer A had a thickness of 10 μm and the following composition:
  a) 87.0 wt.-% of impact modifier 1
  b) 10.0 wt.-% of particulate silica
  c) 2.0 wt.-% of Tinuvin® 1600
  d) 1.0 wt-% of a dispersing agent.

The layer B had a thickness of 60 μm and the following composition:
  a) 19.7 wt.-% of impact modifier 2
  b) 55.3 wt.-% of PMMA 1
  c) 22.2 wt.-% of PMMA 3
  d) 2.7 wt.-% of a pre-prepared mixture of Tinuvin® 360, Tinuvin® 1600 and Chimassorb® 119.

The layer C had a thickness of 5 μm and the following composition:
  a) 78.5 wt.-% of impact modifier 1
  b) 20.0 wt.-% of adhesion promoter
  c) 1.3 wt.-% of Tinuvin® 360
  d) 0.2 wt-% of Chimassorb® 119.

Production Example 2 (Comparative)

A triple layer foil having a total thickness of 75 μm was prepared under the same conditions as in Production Example 1. The foil had the following composition:

The layer A had a thickness of 10 μm and the following composition:
- a) 16.8 wt.-% of impact modifier 2
- b) 67.6 wt.-% of PMMA 2
- c) 10.0 wt.-% of particulate silica
- d) 0.5 wt.-% of Tinuvin® 360
- e) 5.1 wt-% of a pre-prepared mixture of Irganox® 1076 and several dispersing agents.

The layer B had a thickness of 60 μm and the following composition:
- a) 19.7 wt.-% of impact modifier 2
- b) 55.3 wt.-% of PMMA 1
- c) 22.2 wt.-% of PMMA 3
- d) 2.7 wt.-% of a pre-prepared mixture of Tinuvin® 360, Tinuvin® 1600 and Chimassorb® 119.

The layer C had a thickness of 5 μm and the following composition:
- a) 78.5 wt.-% of impact modifier 1
- b) 20.0 wt.-% of adhesion promoter
- c) 1.3 wt.-% of Tinuvin® 360
- d) 0.2 wt-% of Chimassorb® 119.

Production Example 3 (Inventive)

A triple layer foil having a total thickness of 75 μm was prepared under the same conditions as in Production Example 1. The foil had the following composition:

The layer A had a thickness of 10 μm and the following composition:
- a) 65.6 wt.-% of impact modifier 1
- b) 11.3 wt.-% of impact modifier 3
- c) 11.3 wt.-% of PMMA 1
- d) 10.0 wt.-% of particulate silica
- e) 1.9 wt.-% of a pre-prepared mixture of Tinuvin® 360, Tinuvin® 1600 and Chimassorb® 119.

The layer B had a thickness of 60 μm and the following composition:
- a) 19.7 wt.-% of impact modifier 2
- b) 55.3 wt.-% of PMMA 1
- c) 22.2 wt.-% of PMMA 3
- d) 2.7 wt.-% of a pre-prepared mixture of Tinuvin® 360, Tinuvin® 1600 and Chimassorb® 119.

The layer C had a thickness of 5 μm and the following composition:
- a) 78.5 wt.-% of impact modifier 1
- b) 20.0 wt.-% of adhesion promoter
- c) 1.3 wt.-% of Tinuvin® 360
- d) 0.2 wt-% of Chimassorb® 119.

Production Example 4 (Inventive)

A triple layer foil having a total thickness of 75 μm was prepared under the same conditions as in Production Example 1. The foil had the following composition:

The layer A had a thickness of 10 μm and the following composition:
- a) 92.5 wt.-% of impact modifier 1
- b) 7.5 wt.-% of particulate silica.

The layer B had a thickness of 60 μm and the following composition:
- a) 19.7 wt.-% of impact modifier 2
- b) 55.3 wt.-% of PMMA 1
- c) 22.2 wt.-% of PMMA 3
- d) 2.7 wt.-% of a pre-prepared mixture of Tinuvin® 360, Tinuvin® 1600 and Chimassorb® 119.

The layer C had a thickness of 5 μm and the following composition:
- a) 78.5 wt.-% of impact modifier 1
- b) 20.0 wt.-% of adhesion promoter
- c) 1.3 wt.-% of Tinuvin® 360
- d) 0.2 wt-% of Chimassorb® 119.

Production Example 5 (Inventive)

A triple layer foil having a total thickness of 75 μm was prepared under the same conditions as in Production Example 1. The foil had the following composition:

The layer A had a thickness of 10 μm and the following composition:
- a) 62.0 wt.-% of impact modifier 1
- b) 10.6 wt.-% of impact modifier 3
- c) 10.6 wt.-% of PMMA 1
- d) 15.0 wt.-% of particulate silica
- e) 1.8 wt.-% of a pre-prepared mixture of Tinuvin® 360, Tinuvin® 1600 and Chimassorb® 119.

The layer B had a thickness of 60 μm and the following composition:
- a) 19.7 wt.-% of impact modifier 2
- b) 55.3 wt.-% of PMMA 1
- c) 22.2 wt.-% of PMMA 3
- d) 2.7 wt.-% of a pre-prepared mixture of Tinuvin® 360, Tinuvin® 1600 and Chimassorb® 119.

The layer C had a thickness of 5 μm and the following composition:
- a) 78.5 wt.-% of impact modifier 1
- b) 20.0 wt.-% of adhesion promoter
- c) 1.3 wt.-% of Tinuvin® 360
- d) 0.2 wt-% of Chimassorb® 119.

Production Example 6 (Comparative)

A double layer foil having a total thickness of 45 μm was prepared under the same conditions as in Production Example 1. The foil had the following composition:

The layer A had a thickness of 40 μm and the following composition:
- a) 18.6 wt.-% of impact modifier 2
- b) 75.1 wt.-% of PMMA 2
- c) 0.5 wt.-% of Tinuvin® 360
- d) 5.8 wt-% of a pre-prepared mixture of Irganox® 1076 and several dispersing agents.

The layer B had a thickness of 5 μm and the following composition:
- a) 78.5 wt.-% of impact modifier 1
- b) 20.0 wt.-% of adhesion promoter
- c) 1.3 wt.-% of Tinuvin® 360
- d) 0.2 wt-% of Chimassorb® 119.

Production Example 7 (Comparative)

A two-layer hydrophilic coating was applied onto the layer A of the foil of Production Example 6 according to the following procedure:

Preparation of the Intermediate Layer

A first copolymer composed of 88 wt.-% of methyl methacrylate and 12 wt.-% of γ-methacryloyloxypropyltrimethoxysilane and a second copolymer composed of 20 wt.-% of methyl methacrylate and 80 wt.-% of butyl methacrylate were dissolved in a ratio of 1:1 in butyl acetate and applied as a thin layer to the foil. After run-off, the coated foil was dried in an oven at 80° C. for 20 min.

Preparation of Hydrophilic Coating 25 wt.-% of an anionic silica sol (solids content 30 wt.-%), with 0.1 wt.-% of the potassium salt of the 3-sulphopropyl ester of O-ethyldithiocarbonic acid and 0.4 wt.-% of an ethoxylated fatty alcohol were made up to 100 parts with deionized water and coated in a thin layer onto the foil provided with the intermediate layer. After air-drying, the foil provided with intermediate layer and with a hydrophilic coating is dried in a convection oven at 80° C. for 20 min.

Production Example 8 (Comparative)

Layer A of the foil of Production Example 6 was subjected to a corona treatment.

Production Example 9 (Inventive)

A double layer foil having a total thickness of 75 µm was prepared under the same conditions as in Production Example 1. The foil had the following composition:
The layer A had a thickness of 5 µm and the following composition:
a) 82.8 wt.-% of impact modifier 1
b) 10.0 wt.-% of adhesion promoter
c) 5.0 wt.-% of particulate silica
d) 1.8 wt.-% of a pre-prepared mixture of Tinuvin® 360, Tinuvin® 1600 and Chimassorb® 119
e) 0.5 wt-% of a dispersing agent.

The layer B had a thickness of 70 µm and the following composition:
a) 10.3 wt.-% of impact modifier 2
b) 89.5 wt.-% of PMMA 2
c) 0.2 wt.-% Chimassorb® 119.

Production Example 10 (Comparative)

A monolayer foil consisting of single layer A and having a mechanically textured surface (created with a textured embossing roller) was prepared under the same conditions as in Production Example 1. The foil had the following composition:
a) 30.0 wt.-% of impact modifier 1
b) 10.0 wt.-% of impact modifier 2
c) 45.3 wt.-% of PMMA 2
d) 12.5 wt.-% of PMMA 3
e) 2.2 wt.-% of a pre-prepared mixture of Tinuvin® 360 and Chimassorb® 119.

Production Example 11 (Comparative)

A monolayer foil consisting of single layer A was prepared under the same conditions as in Production Example 1. The foil had the following composition:
a) 100.0 wt.-% of PMMA 1.

Production Example 12 (Comparative)

A monolayer foil consisting of single layer A was prepared under the same conditions as in Production Example 1. The foil had the following composition:
a) 74.8 wt.-% of impact modifier 4,
b) 10.0 wt.-% of Degacryl® 6615 (acrylic bead polymer), available from Evonik Industries AG
c) 13.3 wt.-% of PMMA 1
d) 1.9 wt.-% of a pre-prepared mixture of Tinuvin® 360, Tinuvin® 1600 and Chimassorb® 119.

Production Example 13 (Comparative)

A monolayer foil consisting of single layer A was prepared under the same conditions as in Production Example 1. The foil had the following composition:
a) 66.5 wt.-% of impact modifier 4
b) 20.0 wt.-% of Degacryl® 6615 (acrylic bead polymer), available from Evonik Industries AG
c) 11.8 wt.-% of PMMA 1
d) 1.7 wt.-% of a pre-prepared mixture of Tinuvin® 360, Tinuvin® 1600 and Chimassorb® 119.

Production Example 14 (Comparative)

A monolayer foil consisting of single layer A was prepared under the same conditions as in Production Example 1. The foil had the following composition:
a) 78.1 wt.-% of impact modifier 4
b) 6.0 wt.-% of Spheriglass® Potters 5000 CP-01 (glass beads), available from Potters Industries LLC
c) 13.9 wt.-% of PMMA 1
d) 2.0 wt.-% of a pre-prepared mixture of Tinuvin® 360, Tinuvin® 1600 and Chimassorb® 119.

Production Example 15 (Comparative)

A monolayer foil consisting of single layer A was prepared under the same conditions as in Production Example 1. The foil had the following composition:
a) 70.6 wt.-% of impact modifier 4
b) 15.0 wt.-% of Spheriglass® Potters 5000 CP-01 (glass beads), available from Potters Industries LLC
c) 12.6 wt.-% of PMMA 1
d) 1.8 wt.-% of a pre-prepared mixture of Tinuvin® 360, Tinuvin® 1600 and Chimassorb® 119.

Production Example 16 (Comparative)

A monolayer foil consisting of single layer A was prepared under the same conditions as in Production Example 1. The foil had the following composition:
a) 70.6 wt.-% of impact modifier 4
b) 15.0 wt.-% of OMicron® NP3 with P1 coating (glass beads), available from Sovitec Mondial SA
c) 12.6 wt.-% of PMMA 1
d) 1.8 wt.-% of a pre-prepared mixture of Tinuvin® 360, Tinuvin® 1600 and Chimassorb® 119.

Production Example 17 (Comparative)

A monolayer foil consisting of single layer A was prepared under the same conditions as in Production Example 1. The foil had the following composition:
a) 70.6 wt.-% impact modifier 4
b) 15.0 wt.-% of SIPERNAT® 44 MS (zeolite), available from Evonik Industries AG
c) 12.6 wt.-% of PMMA 1
d) 1.8 wt.-% of a pre-prepared mixture of Tinuvin® 360, Tinuvin® 1600 and Chimassorb® 119.

Production Example 18 (Inventive)

A monolayer foil consisting of single layer A was prepared under the same conditions as in Production Example 1. The foil had the following composition:
a) 70.6 wt.-% of impact modifier 4
b) 15.0 wt.-% of particulate silica c) 12.6 wt.-% of PMMA 1
d) 1.8 wt.-% of a pre-prepared mixture of Tinuvin® 360, Tinuvin® 1600 and Chimassorb® 119.

Production Example 19 (Comparative)

A monolayer foil consisting of single layer A was prepared under the same conditions as in Production Example 1. The foil had the following composition:
a) 70.6 wt.-% of impact modifier 4
b) 15.0 wt.-% of SILBOND® 600 MST (a silane treated quartz filler), available from Quarzwerke GmbH
c) 12.6 wt.-% of PMMA 1
d) 1.8 wt.-% of a pre-prepared mixture of Tinuvin® 360, Tinuvin® 1600 and Chimassorb® 119.

Production Example 20 (Comparative)

A monolayer foil consisting of single layer A was prepared under the same conditions as in Production Example 1. The foil had the following composition:
a) 70.6 wt.-% of impact modifier 4
b) 15.0 wt.-% of SILBOND® 600 VST (quartz filler), available from Quarzwerke GmbH
c) 12.6 wt.-% of PMMA 1
d) 1.8 wt.-% of a pre-prepared mixture of Tinuvin® 360, Tinuvin® 1600 and Chimassorb® 119.

Production Example 21 (Comparative)

A monolayer foil consisting of single layer A was prepared under the same conditions as in Production Example 1. The foil had the following composition:
a) 62.3 wt.-% of impact modifier 4
b) 25.0 wt.-% of Spheriglass® Potters 7010 CP-01 (glass beads), available from Potters Industries LLC
c) 11.1 wt.-% of PMMA 1
d) 1.6 wt.-% of a pre-prepared mixture of Tinuvin® 360, Tinuvin® 1600 and Chimassorb® 119.

Production Example 22 (Comparative)

A monolayer foil consisting of single layer A was prepared under the same conditions as in Production Example 1. The foil had the following composition:
a) 62.3 wt.-% of impact modifier 4
b) 25.0 wt.-% of SpheriWhite® 5000 CP-01 (glass beads), available from PQ Corporation
c) 11.1 wt.-% of PMMA 1
d) 1.6 wt.-% of a pre-prepared mixture of Tinuvin® 360, Tinuvin® 1600 and Chimassorb® 119.

Production Example 23 (Comparative)

A monolayer foil consisting of single layer A was prepared under the same conditions as in Production Example 1. The foil had the following composition:
a) 62.3 wt.-% of impact modifier 4
b) 25.0 wt.-% of SpheriWhite® 3000 CP-00 (glass beads), available from PQ Corporation
c) 11.1 wt.-% of PMMA 1
d) 1.6 wt.-% of a pre-prepared mixture of Tinuvin® 360, Tinuvin® 1600 and Chimassorb® 119.

Production Example 24 (Comparative)

A monolayer foil consisting of single layer A was prepared under the same conditions as in Production Example 1. The foil had the following composition:
a) 62.3 wt.-% of impact modifier 4
b) 25.0 wt.-% of SpheriWhite® 3000 CP-01 (glass beads), available from PQ Corporation
c) 11.1 wt.-% of PMMA 1
d) 1.6 wt.-% of a pre-prepared mixture of Tinuvin® 360, Tinuvin® 1600 and Chimassorb® 119.

Preparation of a Polyurethane-(Meth)Acrylate Coating Composition

Pre-Polymer Solution Preparation

Preparation was carried out following the procedure of AT 404241 B, Example 1. A glass reactor equipped with a blade stirred was used. The empty reactor was heated to 70° C. for one hour to dry the inner reactor surface area. During the reaction dried air was fed into the reactor below liquid level. Subsequently, 591.3 g dipentaerythrittetraacrylate, 250.1 g isophoron diisocyanate, 118.3 g n-butyl acetate, 0.96 g dibutyltin dilaurate as a catalyst and 5.41 g 4-methoxyphenol as a polymerization inhibitor were added to the reactor.

The reaction mixture was stirred at a temperature of 60° C. for about 4 hours until the content of free isocyanate groups decreased to half of the initial value (determination according to DIN 53 185) due to formation of urethane bonds. Then 150.8 g 2-ethyl-2-(hydroxymethyl)-1,3-propanediol was added to the reaction mixture and the reaction was stirred for further three hours until the isocyanate content dropped below 0.5% due to formation of further urethane bonds. The reaction mixture was cooled to room temperature and 6.97 g of 4-methoxyphenol dissolved in 150.5 g n-butyl acetate were added.

Preparation of a Coating System 60.00 parts by weight of the above resin component solution was mixed with 20.00 parts by weight Tolonate™ HDT LV2 (aliphatic polyisocyanate based on hexamethylene diisocyanate trimer, available from Worlée-Chemie GmbH, Hamburg) as a hardener component 1.20 parts by weight tert.-butylperbenzoate as a radical former 0.14 parts by weight Kosmos® T12N (dibutyltin dilaurate, available from Evonik Industries AG) as a catalyst 18.66 parts by weight n-butyl acetate as a diluent.

Coating of Foils with a Scratch Resistant Composition

Test Series (a)—Application of a 60 μm Thick Coating Layer

The polyurethane-(meth)acrylate coating system was applied onto the layer A of foils of Production Examples 1 and 6. The thickness of the coating layer D was about 60 μm. The resulting foils were dried at a temperature of 90° C. for 4 minutes, whereby a partial curing of the coating takes place.

Test Series (b)—Application of a 20-30 μm Thick Coating Layer

A further sample of a polyurethane-(meth)acrylate coating composition was applied onto the layer A of foils of Production Examples 1-24 and onto the layer B of foils of Production Examples 6. The thickness of the coating layer D was about 20 to 30 μm. The resulting foils were dried at a temperature below 100° C., whereby a partial curing of the coating takes place.

Preparation and Testing of HPLs

The foils of Production Examples 1 and 6 of the test series (a) and the foils of Production Examples 1-24 of the test series (b) coated as described above were used for preparation of HPLs. The HPLs were produced by simultaneous lamination of phenolic-resin-impregnated paper layers and of the superposed protective foils in accordance with the conditions described in the specification. The layer C, if present, was in direct contact with the resin-impregnated paper layers, thereby acting as an adhesion-promoting layer.

The layer A, coated with a partially cured polyurethane-(meth)acrylate coating composition (layer D), was forming the outer surface of the coated HPL. The core of HPL was composed of phenolic-resin-impregnated papers. Between these and the protective foil there was a melamine-resin-impregnated decorative paper. Anthracite-coloured HPLs were prepared and used for subsequent testing.

The HPLs samples were stored in hot water at 100° C. for 2 hours or, alternatively, at 65° C. for 48 hours. Subsequently, the adhesion was tested using the crosshatch test according to the standard ISO EN 2409 (2013) using a single cutting hand tool.

The results of the crosshatch test where evaluated as follows:
0 The cut edges are completely smooth; none of the squares of the grid have chipped off.
1 At the intersections of the grid lines, small fragments of the coating have chipped off. The chipped area does not exceed 5% of the grid area.
2 The coating has flaked along the cutting edges and/or at the intersections of the grid lines. Flaked area greater than 5% but not greater than 15% of the grid area.
3 The coating is partially or completely flaked off along the cutting edges in wide strips and/or some squares are partially or completely flaked off. Flaked area greater than 15% but not greater than 35% of the cross-cut area.
4 The coating is chipped off along the edges of the cut in wide strips and/or some squares are completely or partially chipped off. Flaked area greater than 35% but not greater than 65% of the cross-cut area.
5 Any flaking that can no longer be classified as lattice cut characteristic 4.

The results of the test series (a) are summarised in Table 1.

TABLE 1

Test series (a)—results of the crosshatch tests

| Production Example No. | Initial adhesion | Adhesion after 2 h at 100° C. | Adhesion after 48 h at 65° C. |
|---|---|---|---|
| 1 | 0 | 1 | 1 |
| 6 | 5 | — | — |

Multilayer foil of Examples 1 (inventive examples) showed an excellent initial adhesion and long-term resistance in a humid environment. In contrast, the multilayer foil of Examples 6 (comparative) showed a poor initial adhesion and was therefore not used for long-term tests.

The results of the test series (b) are summarised in Table 2.

TABLE 2

Test series (b)—results of the crosshatch tests

| Production Example No. | Initial adhesion | Adhesion after 2 h at 100° C. | Adhesion after 48 h at 65° C. |
|---|---|---|---|
| 1 | 0 | 0 | 0 |
| 2 | 5 | — | — |
| 3 | 0 | 0 | 0 |
| 4 | 0 | 0 | 0 |
| 5 | 0 | 0 | 0 |
| 6 | 5 | — | — |
| 6* | 3 | — | — |
| 7 | 5 | — | — |
| 8 | 5 | — | — |
| 9 | 0 | 1 | 1 |
| 10 | 5 | — | — |
| 11 | 2 | | |
| 12 | 0 | 2 | 4 |
| 13 | 0 | 5 | 5 |
| 14 | 3 | 3 | 5 |
| 15 | 0 | 4 | 4 |
| 16 | 0 | 4 | 5 |
| 17 | 4 | 4 | 4 |
| 18 | 0 | 0 | 1 |
| 19 | 4 | 4 | 5 |
| 20 | 4 | 5 | 5 |
| 21 | 0 | 2 | 5 |
| 22 | 0 | 2 | 4 |
| 23 | 0 | 4 | 4 |
| 24 | 0 | 4 | 4 |

*the coating was applied on the layer B of the foil of Production Example 6

Multilayer foils of Examples 1, 3 to 5, 9 and monolayer foil of Example 18 (inventive examples) showed an excellent initial adhesion and long-term resistance in a humid environment. However, the foil of Examples 18 was relatively brittle and, to some extent, difficult to handle. Presence of at least a further layer B could provide the foil a mechanical support and therefore additionally improve its mechanical properties.

Foils of Examples 11-13, 15, 16 and 21 to 24 (comparative examples) showed an excellent initial adhesion but a poor long-term resistance in a humid environment.

Further Tests

The HPL obtained with the foil of Production Example 1 of the test series (b) was subjected to further tests. The results of the test are summarized in Table 3.

TABLE 3

Further tests with the material of Production Example 1

| Test | Norm | Outcome |
|---|---|---|
| Surface hardness | EN 438-2.25: 2016 | 8-9N (Grade 5) |
| Adhesion after water immersion test | 8 h/100° C. | 0 |
| Chemical resistance | EN 438-2.26: 2016, 16 h in acetone | no change |
| Tensile test* | ISO 527-3/200/2, 23° C., 50% RH | 47.2 MPa |

*the test was carried out with the foil of Production Example 1

Hence, the multilayer foil or Example 1 showed an excellent chemical resistance and a long-term resistance in a warm humid environment and a high tensile strength.

The invention claimed is:

1. A multilayer foil comprising a layer A and a layer D adjacent to the layer A, wherein the layer A consists of a moulding composition comprising, based on the total weight of the layer A:
   from 0.0 to 78.0 wt. % of a polyalkyl (meth)acrylate;
   from 20.0 to 98.0 wt. % of an impact modifier;
   from 2.0 to 40.0 wt. % of particulate silica;
   from 0.0 to 20.0 wt. % of an adhesion-promoting copolymer, comprising, based on the weight of the adhesion-promoting copolymer:
   from 70.0 to 99.5 wt. % of methyl methacrylate;
   from 0.5 to 15.0 wt. % of an adhesion-promoting monomer; and from 0.0 to 25.0 wt. % of another vinyl-copolymerizable monomer having no functional group other than a vinyl functional group;
from 0.0 to 38.0 wt. % of a fluoropolymer;
from 0.0 to 5.0 wt. % of a UV absorber; and
from 0.0 to 5.0 wt. % of a UV stabilizer,
wherein
a cumulative content of the polyalkyl (meth)acrylate and the impact modifier in the moulding composition of the layer A is at least 50 wt. %, based on the weight of the layer A,
the particulate silica is a hydrophilic precipitated silica or a hydrophilic pyrogenic silica,
the particulate silica has a silanol group density of not lower than 0.5 SiOH/nm$^2$; and
the layer D comprises at least a partially cross-linked material selected from the group consisting of a cross-linked polyurethane, a cross-linked polyurethane-(meth)acrylate, a cross-linked poly(meth)acrylate, and a mixture thereof.

2. The foil according to claim 1, further comprising a layer B adjacent to the layer A, wherein the layer B consists of a moulding composition comprising, based on the total weight of the layer B:
from 0.0 to 100.0 wt. % of a polyalkyl (meth)acrylate;
from 0.0 to 95.0 wt. % of an impact modifier;
from 0.0 to 40.0 wt. % of a fluoropolymer;
from 0.0 to 5.0 wt. % of a UV absorber;
from 0.0 to 5.0 wt. % of a UV stabilizer; and
from 0.0 to 20.0 wt. % of an adhesion-promoting copolymer, comprising, based on the weight of the adhesion-promoting copolymer:
from 70.0 to 99.5 wt. % of methyl methacrylate;
from 0.5 to 15.0 wt. % of an adhesion-promoting monomer; and
from 0.0 to 25.0 wt. % of another vinyl-copolymerizable monomer having no functional group other than a vinyl functional group,
wherein the cumulative content of the polyalkyl (meth)acrylate and the impact modifier in the moulding composition of the layer B is at least 50 wt. %, based on the weight of the layer B.

3. The foil according to claim 1, wherein the content, in wt. %, based on the total weight of the layer A, the impact modifier $n_{im}$ in the polyalkyl (meth)acrylate foil satisfies the following relationship:

$$0.01*n_{im}<n_{si}<0.4*n_{im}$$

$n_{si}$ being the content, in wt. %, of the particulate silica in the foil.

4. The foil according to claim 1, wherein the particulate silica has a specific surface area, measured by BET method according to ISO 9277, of more than 200 m$^2$/g.

5. The foil according to claim 1, wherein the particulate silica is a hydrophilic precipitated silica.

6. The foil according to claim 1, wherein the particulate silica is a precipitated silica which has a weight average particle size d$_{50}$ of from 1.0 µm to 20.0 µm determined by laser diffraction according to ISO 13320.

7. The foil according to claim 1, wherein the particulate silica is a precipitated silica having a specific surface area, measured by BET method according to ISO 9277, of more than 500 m$^2$/g.

8. The foil according to claim 1, wherein the particulate silica has DBP absorption of 100 to 500 g/100 g determined in accordance with ASTM D6854-12a.

9. The foil according to claim 1, wherein the particulate silica has a tamped density from 10 g/l to 800 g/l determined in accordance with DIN EN ISO 787-11.

10. The foil according to claim 1, wherein the polyalkyl (meth)acrylate is a polymethyl methacrylate having a mass average molar weight Mw of from 50 000 g/mol to 180 000 g/mol, and is obtained by polymerization of a composition whose polymerizable constituents comprise, based on the weight of the polymerizable composition:
(a) from 50.0 to 99.9 wt. % of methyl methacrylate;
(b) from 0.1 to 50.0 wt. % of an acrylic acid ester of a C1-C4 alcohol; and
(c) from 0.0 to 10.0 wt. % of a monomer copolymerizable with the monomers (a) and (b).

11. The foil according to claim 1, wherein the impact modifier is at least one particulate impact modifier selected from the group consisting of core, core-shell, core-shell-shell, and core-shell-shell-shell impact modifiers.

12. The foil according to claim 2, wherein the layer B comprises, based on the total weight of the layer B:
from 0.5 to 4.0 wt. % of a benzotriazole compound as a first UV absorber;
from 0.5 to 3.0 wt. % of a triazine compound as a second UV absorber; and
from 0.2 to 2.0 wt. % of a Hindered Amine Light Stabilizer (HALS) compound as a UV stabilizer.

13. The foil according to claim 2, wherein the foil further comprises a layer C, wherein the layer B is located between the layer A and the layer C, and wherein the layer B consists of a moulding composition comprising, based on the total weight of the layer B:
from 0.0 to 100.0 wt. % of a polyalkyl (meth)acrylate;
from 0.0 to 95.0 wt. % of an impact modifier;
from 0.0 to 40.0 wt. % of a fluoropolymer;
from 0.0 to 5.0 wt. % of a UV absorber; and
from 0.0 to 5.0 wt. % of a UV stabilizer, and
wherein the layer C consists of a moulding composition comprising, based on the total weight of the layer C:
from 0.0 to 78.0 wt. % of a polyalkyl (meth)acrylate;
from 20.0 to 98.0 wt. % of an impact modifier;
from 0.0 to 40.0 wt. % of particulate silica;
from 0.0 to 40.0 wt. % of an adhesion-promoting copolymer, comprising, based on the weight of the adhesion-promoting copolymer:
from 70.0 to 99.5 wt. % of methyl methacrylate;
from 0.5 to 15.0 wt. % of an adhesion-promoting monomer; and
from 0.0 to 25.0 wt. % of another vinyl-copolymerizable monomer having no functional group other than a vinyl functional group
from 0.0 to 5.0 wt. % of a UV absorber; and
from 0.0 to 5.0 wt. % of a UV stabilizer,
wherein a cumulative content of the polyalkyl (meth)acrylate and the impact modifier in the moulding composition of the layer C is at least 50 wt. %, based on the weight of the layer C; and
a cumulative content of the particulate silica and the adhesion-promoting copolymer is at least 2.0 wt %, based on the weight of the layer C.

14. The foil according to claim 13, wherein
the layer A has a thickness from 1.0 µm to 150.0 µm;
the layer B has a thickness from 15.0 µm to 150.0 µm;
the layer C has a thickness from 1.0 µm to 30.0 µm; and
the layer D has a thickness from 10.0 µm to 50.0 µm.

15. A multi-layer article, having an outer surface, comprising a substrate which is at least partially covered by the foil according to claim 13, comprising the layers A, B, C, and D in the following order, starting from the outer surface of the multi-layer article:
- layer D forming the outer surface of the multi-layer article;
- layer A;
- layer B; and
- layer C.

16. A process for manufacturing the multi-layer article according to claim 15, the process comprising i) to iii):
- i) preparing a foil comprising the layers A, B and C by co-extrusion;
- ii) coating the layer A of the foil obtained in the preparing i) with the layer D; and
- iii) applying the coated foil obtained in the coating ii) onto a substrate by lamination or extrusion lamination, wherein the multi-layer article is obtained,
- wherein the coating layer D comprises a material which undergoes a partial cross-linking in the coating ii) and a further cross-linking in the applying iii).

17. The process according to claim 16, wherein the multi-layer article is a high-pressure laminate, and wherein the applying of iii) is carried out at a pressure of from 1 MPa to 20 MPa and a temperature of from 120° C. to 220° C.

\* \* \* \* \*